US008687497B2

(12) United States Patent
Sands et al.

(10) Patent No.: US 8,687,497 B2
(45) Date of Patent: Apr. 1, 2014

(54) REDUCED MEMORY VECTORED DSL

(75) Inventors: Nicholas P. Sands, Menlo Park, CA (US); Kevin D. Fisher, Palo Alto, CA (US)

(73) Assignee: Ikanos Communications, Inc., Fremont, CA (US)

( * ) Notice: Subject to any disclaimer, the term of this patent is extended or adjusted under 35 U.S.C. 154(b) by 391 days.

(21) Appl. No.: 13/002,213

(22) PCT Filed: Jun. 30, 2009

(86) PCT No.: PCT/US2009/049283
§ 371 (c)(1),
(2), (4) Date: Dec. 30, 2010

(87) PCT Pub. No.: WO2010/002908
PCT Pub. Date: Jan. 7, 2010

(65) Prior Publication Data
US 2011/0110409 A1    May 12, 2011

Related U.S. Application Data

(60) Provisional application No. 61/077,169, filed on Jul. 1, 2008.

(51) Int. Cl.
*G01R 31/08* (2006.01)
(52) U.S. Cl.
USPC ........... 370/236; 370/432; 370/437; 370/443; 370/447; 725/114; 725/119; 725/121; 725/138; 375/222
(58) Field of Classification Search
None
See application file for complete search history.

(56) References Cited

U.S. PATENT DOCUMENTS

| 6,724,849 | B1* | 4/2004 | Long et al. ................... 375/371 |
| 7,843,949 | B2* | 11/2010 | Xu ................................. 370/401 |
| 2003/0086514 | A1 | 5/2003 | Ginis et al. |

(Continued)

FOREIGN PATENT DOCUMENTS

| WO | WO2010/002908 A1 | 1/2010 |
| WO | WO2010/019486 A2 | 2/2010 |

OTHER PUBLICATIONS

Vectored Transmission for Digital Subscriber Line Systems George Ginis & John M. Cioffi IEEE Journal on Selected Areas in Communications, vol. 20, No. 5, Jun. 2002.*

(Continued)

*Primary Examiner* — Ian N. Moore
*Assistant Examiner* — Eric H Wang
(74) *Attorney, Agent, or Firm* — Pillsbury Winthrop Shaw Pittman LLP

(57) ABSTRACT

A reduced-memory vectored DSL system includes methods and apparatus for reducing the bandwidth and memory storage demands on a vectored DSL system in which FEXT data is transmitted and stored. An upstream-end device such as a DSLAM communicates with a plurality of downstream-end devices such as CPE modems. When test signal data, such as training and/or tracking data, is sent to determine FEXT characteristics of the DSL system, error signals are available for all or substantially all of the upstream and/or downstream frequency band DSL tones used in the system. Dividing a frequency band into sub-bands, only a subset of tones in each sub-band is used for deriving FEXT data, such as a FEXT channel response, FEXT channel coefficients and/or FEXT cancellation coefficients. For tones in the sub-band subsets, full-precision FEXT data values can be derived. For other tones, approximations of the FEXT data can be derived.

12 Claims, 28 Drawing Sheets

(56) References Cited

U.S. PATENT DOCUMENTS

| | | |
|---|---|---|
| 2005/0259725 A1 | 11/2005 | Cioffi |
| 2006/0280235 A1 | 12/2006 | Rhee et al. |
| 2007/0263711 A1 | 11/2007 | Kramer et al. |
| 2008/0160915 A1 | 7/2008 | Sommer et al. |
| 2009/0086798 A1 | 4/2009 | Zukunft et al. |
| 2009/0207985 A1 | 8/2009 | Cioffi et al. |

OTHER PUBLICATIONS

Cendrillon, R., et al., "Partial crosstalk precompensation in downstream VDSL," Signal Processing vol. 84, pp. 2005-2019 (2004).

Ginis G., et al., "Vectored-DMT: A FEXT Canceling Modulation Scheme for Coordinating Users," Proceedings of IEEE ICC 2001, vol. 1, pp. 305-309, Jun. 2001, Helsinki, Finland.

Rissanen, J.J., et al., "Arithmetic coding," IBM Journal of Research and Development, vol. 23, No. 2, Mar. 1979.

Witten, I.A., et al., "Arithmetic Coding for Data Compression," Communications of the ACM, vol. 30, No. 6, pp. 520-540, Jun. 1987.

Huffman, D.A., "A Method for the Construction of Minimum-Redundancy Codes," Proceedings of the I.R.E., pp. 1098-1102, Sep. 1952.

Golomb, S. "Run-length encodings," IEEE Transactions on Information Theory, vol. 12, No. 3, pp. 399-401, 1966.

\* cited by examiner

*Figure 16*

| Sub-Field Names | Sub-Field Length (bits) | Parameter Description | Field Length (bits) | Field Name |
|---|---|---|---|---|
| Ports In Packet | 16 | 16-bit map of ports included in packet. LSB=port 0 | 16 | Ports in Packet |
| Superframe Index | 15 | this allows pilot sequence lengths up to 1024. Index resets to zero at start of Pilot Symbol Sequence. | 24 | Index |
| Symbol Index | 9 | 0:255=data frames, 256= sync frame, 257-511 undefined | | |
| Band StartBin Index | 16 | first tone of band | | Bin Range |
| Band StopBin Index | 16 | last tone of band | 32 | |
| Port 0 Data | 2*b | b=configured FFT/IFFT data precision, port 0 first | | |
| Port 1 Data | 2*b | | 2*N*b | StartBin Payload |
| ... | ... | | | |
| Port N-1 Data | 2*b | | | |
| Port 0 Data | 2*b | b=configured FFT/IFFT data precision | | |
| Port 1 Data | 2*b | | 2*N*b | StartBin+1 Payload |
| ... | ... | | | |
| Port N-1 Data | 2*b | | | |
| Port 0 Data | 2*b | b=configured FFT/IFFT data precision | | |
| Port 1 Data | 2*b | | 2*N*b | StopBin Payload |
| ... | ... | | | |
| Port N-1 Data | 2*b | | | ... |
| CRC | 16 | Not required if included in Serdes protocol. Can pad Payload to make entire payload 16 bit multiple. | 16 | CRC |

REDUCED MEMORY VECTORED DSL

PRIORITY CLAIM AND CROSS-REFERENCE TO RELATED APPLICATIONS

This application claims the benefit of priority under 35 U.S.C. §119 and any other United States or other law of the following:

U.S. Ser. No. 61/077,169 filed Jul. 1, 2008, entitled ADAPTIVE INTER-TONE DIFFERENTIAL ENCODING OF FAR-END CROSSTALK CHANNEL ESTIMATES IN A DISCRETE MULTI-TONE SYSTEM the entire disclosure of which is incorporated herein by reference in its entirety for all purposes; and PCT International Application No. PCT/US2009/049283 filed Jun. 30, 2009, entitled REDUCED MEMORY VECTORED DSL, the entire disclosure of which is incorporated herein by reference in its entirety for all purposes.

TECHNICAL FIELD

The present invention relates generally to the field of vectored DSL communication systems.

BACKGROUND

Digital Subscriber Line (DSL) communications suffer from various forms of interference, including crosstalk. Various techniques have been developed to combat this interference and its deleterious effects on data transmission. Vectored DSL has been one such measure in development for some time. The amount of data that must be transmitted between downstream and upstream modems is substantial for vectored DSL systems and this vectoring data pertaining to FEXT interference also must be stored and manipulated/processed by upstream device such as vectoring modules and the like. Systems, apparatus and/or other hardware implementations that provide reduced memory transmission and storage of vectored DSL data would represent a significant advancement in the art.

SUMMARY

Embodiments of the present invention include apparatus and methods pertaining to reduced-memory generation, transmission, use and storage of FEXT data in DSL systems. In approximation-based embodiments, the relevant frequency bands of the DSL system are further divided into sub-bands, wherein each sub-band typically (though not always) contains an equal number of tones. For example, where a given DSL frequency band is divided into sub-bands, the number of DSL tones in the divided frequency band might not be an even multiple of the number of uniform sub-bands, so a minor number of sub-bands might not have the standard tone count. Therefore, in dividing a frequency band, "substantially all sub-bands" will have the same number of DSL tones per sub-band.

Test signals received as a receiving modem contain information relating to FEXT in substantially all tones of the DSL system in which the receiving modem operates. Only the FEXT data pertaining to a subset of the tones in each sub-band is used in generating an approximation of the FEXT channel or other FEXT data. In some embodiments, the FEXT data pertaining to the subset of tones is used to generate a linear or polynomial approximation of the FEXT cancellation coefficient plot. The tones for which actual FEXT error signals are available can be used to generate full-precision FEXT cancellation coefficients, while the tones not included in the sub-band subsets have their FEXT cancellation coefficients approximated. Where the FEXT cancellation coefficients are used in pre-cancelling downstream FEXT, less bandwidth is needed for CPE modems or the like to return FEXT data for vectoring—rather than sending FEXT data for all or substantially all tones in the DSL system (or all or substantially all downstream frequency band tones for the DSL system), only FEXT data for the subset of tones in each sub-band need to be transmitted upstream to the DSLAM or other upstream-end device performing vectoring. In the upstream-end device, less memory storage is required to store vectoring data because of the use of the approximation of the FEXT cancellation coefficients. This also can reduce upstream-end bandwidth usage where a separate vectoring processing system is used that is coupled to the DSLAM or upstream modems and where FEXT data (for example, error signals representing FEXT effects, FEXT channel response data, FEXT cancellation coefficients, etc.) are transmitted between the vectoring processing apparatus and the upstream modems or DSLAM. Where upstream FEXT is involved, the downstream-to-upstream bandwidth transmission bandwidth is not an issue, but FEXT data storage and upstream-end bandwidth usage still benefits substantially from the approximation techniques of some embodiments of the present invention.

In other embodiments of the present invention, methods and apparatus utilize a differential/incremental value system that characterizes or defines FEXT data (for example, FEXT cancellation coefficients) in terms of a sub-band base point and incremental or differential values that describe each tone's FEXT cancellation coefficient for a given tone in the sub-band as either (1) a base point value plus differential value for the particular tone, or (2) as the previous tone's coefficient value plus a differential/incremental value for the next tone's coefficient.

In still other embodiments of the present invention, both the approximation and differential/incremental value methods, apparatus and/or techniques can be combined to provide other vectored DSL systems and operation.

BRIEF DESCRIPTION OF DRAWINGS

The present invention will be readily understood by the following detailed description in conjunction with the accompanying drawings, wherein like reference numerals designate like structural elements, and in which:

FIG. 16 is an example of a packet structure according to one or more embodiments of the present invention.

DETAILED DESCRIPTION

Figure 1:
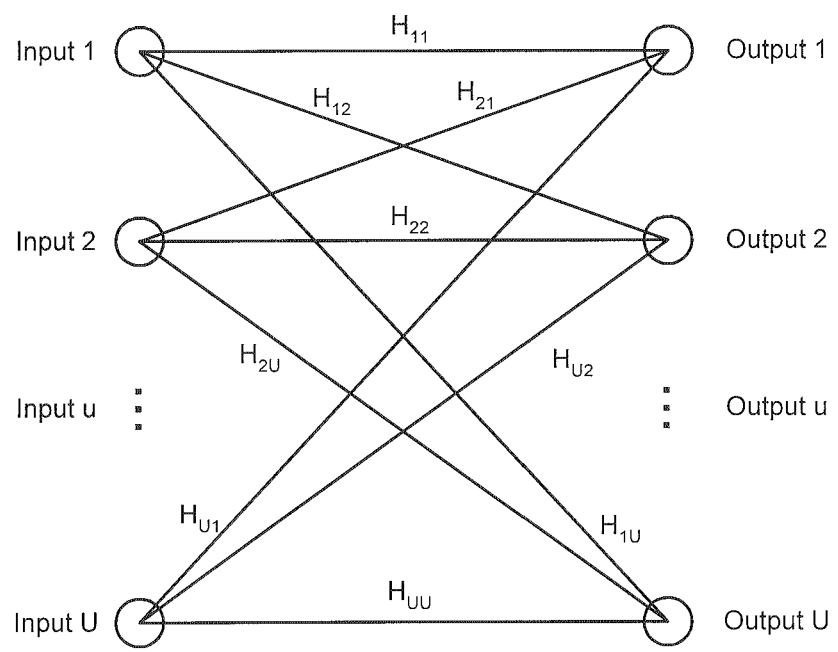
FIG. 1 is a (MIMO) system in which embodiments of the present invention can be implemented.

The following detailed description will refer to one or more embodiments, but the present invention is not limited to such embodiments. Rather, the detailed description and any embodiment(s) presented are intended only to be illustrative. Those skilled in the art will readily appreciate that the detailed description given herein with respect to the Figures is provided for explanatory purposes as the invention extends beyond these limited embodiments.

Certain terms are used throughout the description and claims to refer to particular system components. As one skilled in the art will appreciate, computer and other companies may refer to components by different names. This disclosure does not intend to distinguish between components that differ insubstantially. Phrases such as "coupled to" and "connected to" and the like are used herein to describe a connection between two devices, elements and/or components and are intended to mean physically and/or electrically either coupled directly together, or coupled indirectly together, for example via one or more intervening elements or components or via a wireless connection, where appropriate. The term "chip" refers broadly to a hardware device that operates in a prescribed manner, for example to process data, and can include various types of such devices (for example, a field-programmable gate array (FPGA), a digital signal processing (DSP) chip, an application-specific integrated circuit (ASIC), an integrated circuit (IC), etc.). The term "system" refers broadly to a collection of two or more components and may be used to refer to an overall system (e.g., a computer and/or communication system or a network comprising one or more computers, communication components, etc.), a subsystem provided as part of a larger system (e.g., a subsystem within an individual computer), and/or a process or method pertaining to operation of such a system or subsystem. In this specification and the appended claims, the singular forms "a," "an," and "the" include plurals unless the context clearly dictates otherwise. Unless defined otherwise, technical and scientific terms used herein have the same meanings that are not inconsistent to one of ordinary skill in the art relevant subject matter disclosed and discussed herein.

Reference in the specification to "some embodiments," "one embodiment," "an embodiment," etc. of the present invention means that a particular feature, structure or characteristic described in connection with such embodiment(s) is included in at least one embodiment of the present invention. Thus, the appearances of the noted phrases in various places throughout the specification are not necessarily all referring to the same embodiment.

In the absence of crosstalk, the existing copper telephone infrastructure can in theory be utilized to carry from tens to hundreds of megabits per second over distances up to approximately 5000 feet using discrete multitone (DMT) digital subscriber line (DSL) modem technology. DMT modems divide the available bandwidth into many sub-carriers (also referred to as "tones" or "frequency bins") that are synchronized and independently modulated with digital QAM data to form an aggregate communication channel between the network and subscriber. DMT-based DSL systems typically use Frequency Division Multiplexing (FDM) and assign particular sub-carriers to either downstream (that is, from DSLAM/CO to CPE/user) or upstream (from CPE/user to DSLAM/CO) directions. This FDM strategy limits near end crosstalk (NEXT). DMT systems are typically very robust in the presence of radio frequency interference (RFI) and other types of frequency-selective noise (or interference) or channel dispersion, because each sub-carrier can be independently modulated with an appropriate amount of data and power in order to meet the system requirements and the desired bit error rate.

Typical telephone binder cables typically contain between 10 and 50 unshielded copper twisted pairs (these binders are then bundled into larger cables). Due to variations in manufacturing and imperfect cable installation (for example, bending, etc.), significant levels of far-end crosstalk (FEXT) occur between each twisted pair within a binder (and between adjacent binders). More specific discussions concerning FEXT can be found in the various patent applications filed by Adaptive Spectrum and Signal Alignment of Redwood City, Calif. and Stanford University. In particular, the following patents and published applications are incorporated herein by reference for all purposes:

| Document No. | Pub. date | Title |
|---|---|---|
| U.S. Pat. No. 6,512,797 | Jan. 28, 2003 | Peak to average power ratio reduction |
| U.S. Pat. No. 6,424,681 | Jul. 23, 2002 | Peak to average power ratio reduction |
| U.S. Pat. No. 6,314,146 | Nov. 06, 2001 | Peak to average power ratio reduction |
| U.S. Pat. No. 7,394,752 | Jul. 01, 2008 | Joint reduction of NEXT and FEXT in xDSL systems |
| U.S. Pat. No. 7,158,563 | Jan. 02, 2007 | Dynamic digital communication system control |
| U.S. Pat. No. 7,027,537 | Apr. 11, 2006 | Iterative multi-user detection |
| U.S. Pat. No. 6,990,196 | Jan. 24, 2006 | Crosstalk identification in xDSL systems |

-continued

| Document No. | Pub. date | Title |
|---|---|---|
| U.S. Pat. No. 6,829,307 | Dec. 07, 2004 | Express bit swapping in a multicarrier transmission system |
| U.S. Pat. No. 5,479,447 | Dec. 26, 1995 | Method and apparatus for adaptive, variable bandwidth, high-speed data transmission of a multicarrier signal over digital subscriber lines |
| US 20020136397 | Sep. 26, 2002 | Crosstalk identification in xDSL systems |
| US 20030086362 | May 08, 2003 | Joint reduction of NEXT and FEXT in xDSL systems |
| US 20030086514 | May 08, 2007 | Dynamic digital communication system control |
| US 20070081582 | Apr. 12, 2007 | Dynamic digital communication system control |
| WO/2005/057857 | Jun. 23, 2005 | DSL system estimation and parameter recommendation |
| WO/2005/057315 | Jun. 23, 2005 | Adaptive margin and band control |
| WO/2005/057837 | Jun. 23, 2005 | Adaptive FEC codeword management |
| WO/2005/094052 | Oct. 06, 2005 | High speed multiple loop DSL system |
| WO/2005/114861 | Dec. 01, 2005 | FEXT determination system |
| WO/2005/114924 | Dec. 01, 2005 | Incentive-based DSL system |
| WO/2006/051359 | May 18, 2006 | Interference cancellation system |
| WO/2006/018716 | Feb. 23, 2006 | DSL data collection system |
| WO/2006/048770 | May 11, 2006 | Communication device identification |
| WO/2006/092730 | Sep. 08, 2006 | DSL system estimation including known DSL line scanning and bad splice detection capability |
| WO/2006/103557 | Oct. 05, 2006 | DSL state and line profile control |
| WO/2006/120511 | Nov. 16, 2006 | QR decomposition in DSL equalizers using real givens rotations |
| WO/2006/120521 | Nov. 16, 2006 | DSL system estimation and control |
| WO/2006/120510 | Nov. 16, 2006 | Phantom use in DSL systems |
| WO/2006/129141 | Dec. 07, 2006 | Tonal preceding in multi-user vectored DSL transmission |
| WO/2006/129140 | Dec. 07, 2006 | DSL system training |
| WO/2006/129143 | Dec. 07, 2006 | Adaptive GDFE |
| WO/2006/131792 | Dec. 14, 2006 | User-preference-based DSL system |
| WO/2006/131794 | Dec. 14, 2006 | User-preference-based DSL system |
| WO/2006/131793 | Dec. 14, 2006 | DSL system loading and ordering |
| WO/2006/131791 | Dec. 14, 2006 | Vectored DSL nesting |
| WO/2006/136883 | Dec. 18, 2006 | Dynamic minimum-memory interleaving |
| WO/2006/129145 | Dec. 07, 2006 | Self-learning and self-adjusting DSL system |
| WO/2006/120513 | Nov. 16, 2006 | Binder identification |
| WO/2007/008835 | Jan. 18, 2007 | DSL system estimation |
| WO/2007/008836 | Jan. 18, 2007 | Adaptive margin and band control |
| WO/2007/044326 | Apr. 19, 2007 | DSL system |
| WO/2007/130877 | Nov. 15, 2007 | Methods and apparatus to combine data from multiple sources to characterize communication systems |
| WO/2007/130878 | Nov. 15, 2007 | Methods and apparatus to perform line testing at customer premises |
| WO/2007/130879 | Nov. 15, 2007 | Video streaming diagnostics |
| WO/2007/146048 | Dec. 21, 2007 | Vectored DSL system |
| WO/2008/016585 | Feb. 07, 2008 | Method and apparatus for analyzing and mitigating noise in a digital subscriber line |
| WO/2008/045332 | Apr. 17, 2008 | Interference cancellation system |
| WO/2008/045525 | Apr. 17, 2008 | High speed multiple user multiple loop DSL system |
| WO/2008/073327 | Jun. 19, 2008 | DSL ring signal compatibility |

As a result of typical cable construction, installation and deployment techniques, each twisted pair is physically adjacent to many other twisted pairs in (or outside) its binder for a significant distance in the cable. While there is variation in the FEXT levels as a result of manufacturing variation, the net result is that every copper pair imparts some amount of FEXT onto virtually every other copper pair in the cable. In many instances, the FEXT can be as much as or more than 40 dB higher than the background noise level on the line and the crosstalk typically increases with frequency. Cable measurements have shown that each particular line has at least, and often more than, 5 to 10 disturbers that impact the line's performance. As a result, FEXT is the dominant impairment in reaching high data rates in DMT DSL systems on relatively short loops (for example, below 4,000 feet).

An advanced signal processing technique called "vectoring" can cancel FEXT between twisted pairs within copper telephone cables and permit dramatically higher data rates. Vectoring is well known to those skilled in the art, and is explained in more detail in "Vectored Transmission for Digital Subscriber Line Systems," by G. Ginis and J. Cioffi (IEEE JSAC special issue on twisted-pair transmission, Vol. 20, Issue 5, pp. 1085-1104, June 2002); and "Vectored-DMT: A FEXT Canceling Modulation Scheme for Coordinating Users," by G. Ginis and J. Cioffi (Proceedings of IEEE ICC 2001, Vol. 1, Helsinki, Finland, pp. 305-09, June 2001), both of which are incorporated by reference herein for all purposes.

The basic principle behind vectoring is coordinating communications between every twisted pair in a telephone cable. Because all twisted pairs in the cable terminate in one central location known as a DSLAM (DSL access multiplexer), the DSLAM is the natural location to coordinate this communication. To vector the modems effectively in the vectoring systems, the modems must be synchronized to the same DMT symbol clock and must have synchronized training/tracking periods with pre-arranged training data patterns (unique to each modem) to allow victim modems to identify the crosstalk channel characteristics between particular disturber-victim modem pairs. As will be appreciated by those skilled in the art, there are a variety of techniques for identifying crosstalk in such systems, including one or more that may be described in various applicable standards pertaining to DSL systems and their implementation.

Using "crosstalk topography" or mapping, which typically is viewed or considered as a matrix representing the various interactive/crosstalking relationships between DSL lines determined during training, tracking and the like, transmit pre-compensation (for example, precoding) can be used in the downstream direction (from DSLAM to customer site). In effect, the transmit waveform for a given modem is pre-distorted based on the transmit waveforms being used by many other modems (that is, the other modems whose FEXT materially affect the given modem's signals), such that the interfering FEXT is effectively balanced (counteracted) and the FEXT's effects thus eliminated by the time the pre-distorted modem signal reaches its customer side terminus. In the upstream direction (from customer site to DSLAM), MIMO (multiple-input-multiple-output) spatial filtering is used at the DSLAM to cancel upstream FEXT at the upstream receive side. Identification and tracking of the FEXT filter cancellation coefficients may be performed using the LMS (Least Mean Squares) adaptive algorithm or other Least-Squares type methods, as is well known to those skilled in the art. Training data (for example, training signals) to support identification of the FEXT filter coefficients may be integrated into a modified version of a known DSL standard, such as VDSL2.

Embodiments of the present invention utilize techniques and apparatus to reduce the memory needed for both transmission/communication from downstream CPE apparatus to upstream DSLAM apparatus or the like of what will be referred to as "FEXT data" (for example, received error signals or other signals that are proxies for the FEXT interference on a given DSL line, FEXT compensation filter coefficients, FEXT channel estimates or coefficients, a FEXT compensation matrix G, back-channel communication signals conveying any of this information, etc.) as well as storage of FEXT data used for vectoring in DSLAM side modems. Embodiments of the present invention can be used to realize advantageous reductions in the amount of data needed/used for FEXT channel estimates and/or FEXT crosstalk cancellation coefficients. Moreover, these embodiments reduce memory storage requirements, reduce memory bandwidth usage and reduce sync symbol error communication from the customer premises equipment (CPE) side during training and/or tracking.

Embodiments of the present invention use one or a combination of two approaches—(1) the use of approximations of crosstalk attenuation data, crosstalk cancellation data and/or crosstalk cancellation coefficients, and/or (2) the use of incremental/differential value based representations of such crosstalk attenuation data, crosstalk cancellation data and/or crosstalk cancellation coefficients. Again, implementation of one or a combination of these embodiments yields (1) a vectored DSL system that imposes less of a bandwidth burden for transmissions of data from CPE side collectors of crosstalk data to DSLAMs, and/or (2) a vectored DSL system that has lower data storage requirements at the DSLAM side for crosstalk cancellation coefficients, as well as lower memory bandwidth demands associated with accessing the coefficient data for processing within the DSLAM or the like.

As illustrated in FIG. 1, a multiple-input multiple-output (MIMO) system can be characterized by its system (or channel) responses from each input to each output of the system. For linear systems, the system responses are linear functions. For example, inputs 1 through U and outputs 1 through U have system responses $H_{ij}$ (FEXT channel responses/coefficients for i≠j, and direct channel responses/coefficients for i=j), namely $H_{11}, H_{12}, \ldots, H_{1U}, H_{21}, \ldots, H_{U1}, H_{U2}, \ldots, H_{UU}$. Any given $\text{Output}_u$ is thus the aggregate response from every input (1 to U) to that output. To communicate data reliably and at high rates over such a MIMO system, the system responses must be known. To identify these system responses, $H_{ij}$ with (i,j=1:U), the inputs can be stimulated with test signal input data (for example, pilot and/or orthogonal training or tracking sequences, as is well known to those skilled in the art) and the test signal output data of the system received, observed, measured and/or collected by CPE modems and/or other downstream-end devices. The data received or computed by a receiving modem is typically an error signal. That is, each modem knows what the training or tracking data inputs are and what the output signal is that the modem should receive if no crosstalk is present. The receiving modem calculates an error signal that is representative of the difference between the expected transmission output and the actual (FEXT perturbed) transmission output. These error signals can be sent to a DSLAM or the like as an indication of a given DSL line's FEXT interference. The DSLAM collects these error signals from all of the relevant CPE modems and correlates the data to determine the $H_{ij}(k)$ coefficients that represent crosstalk effects in the relevant DSL lines.

Thus, each sub-channel becomes an independent MIMO system whose channel response can be independently (and simultaneously) identified. In such a DSL MIMO system, the direct system responses, $H_{ii}$, correspond to the desired modem response signal for a single sub-channel from each modem u's own twisted pair and the remaining terms, $H_{ij}$, where i≠j, correspond to FEXT from other twisted pairs in the binder cable (and sometimes from a different cable). Such a MIMO system exists in both the upstream and downstream directions where groups of tones are assigned to either upstream or downstream communication. As noted above, the upstream and downstream directions use frequency division multiplexing to avoid excessive impact from NEXT. In this type of system, all telco-side modems terminate in the DSLAM, and the CPE modems are widely dispersed at many subscriber facilities. Such a crosstalk canceling DMT DSL modem system is called vectored DSL. Various examples of DSL systems using one or more embodiments of the present invention will be described herein in connection with a DSLAM coupled to a number of CPE modems. However, as will be appreciated by those skilled in the art, embodiments of the present invention can be used in other DSL transmission and vectoring settings and structures. For example, a DSL line may couple a DSLAM to an intermediate DSL line device such as an optical networking termination point (ONT), a signal repeater, etc. Likewise, the upstream end of a DSL line might terminate with a device or apparatus other than a DSLAM alone. That is, embodiments of the present invention can be used in a variety of DSL settings in which the DSL line terminates with a downstream transceiver and an upstream transceiver.

Receive-side upstream vectoring can be performed at the DSLAM side, as all DSLAM-side modems terminate in one location and the necessary FEXT data is available (or can be more easily obtained) to perform crosstalk cancellation. Transmit-side downstream vectoring is performed using transmit pre-compensation and FEXT cancellation (receive-side vectoring usually is not feasible at the CPE side because of the CPE modems' typically wide dispersion in many subscriber locations, except in the case of bonded DSL lines where CPE modems might be co-located).

For previous DSLAM-side vectoring systems to perform transmit pre-compensation effectively, each coupled CPE modem measured/collected its FEXT response for each tone in the DMT system (based, for example, on its training data transmitted from the telco side modems) and sent each tone's measurement back to the telco/DSLAM side modem (over some type of "back-channel") for further processing and FEXT channel estimation. As is well known to those skilled in the art, each value/datum sent to the DSLAM by the CPE after crosstalk training may be a proxy for $H_{ij}$, rather than the value of $H_{ij}$ itself. When discussed herein, such minor variations in commonly used and/or known notation and/or quantities is not discussed in detail. Alternatively, the CPE modem could perform any needed FEXT channel estimation processing and then send these channel estimates back to the telco/DSLAM side over the back-channel. Because FEXT channel characteristics can vary over time, these channel estimates typically are tracked and updated regularly over time.

Upstream back-channel communication of FEXT data can be a significant bottleneck and subsequent storage of FEXT data can be a substantial memory burden in implementing DMT-based vectored DSL systems. Back-channel communication of FEXT channel measurements or the like is an especially big problem during system startup, as only a low hit-rate control channel is available during this preliminary startup period (prior to full modem training and initialization). This communication bottleneck can slow system-training time, thus postponing useful operation of the system from the user's perspective. Back-channel communication also is a problem during normal system operation, as most DSL frequency band schemes are biased in favor of higher downstream communication rates at the expense of lower upstream communication rates (for example, by a ratio of up to 10 to 1). Thus back-channel communication may constitute a significant percentage of a total available upstream data rate. If sufficient bandwidth is not allocated for updating FEXT channel measurements, such updates may be slowed to a level that prevents adequate tracking of channel variation over time.

Storage of the FEXT channel data is a related problem. Generally, a MIMO system with U users has $U^2$ total channel responses (including U desired direct channel responses and $U*(U-1)$ FEXT channel responses) that are calculated and stored for each DMT system tone. While some optimization techniques can reduce this storage burden (for example, using optimized FEXT channel training sequences and techniques that ignore FEXT channels with smaller channel response values), the storage requirements can still be very large and burdensome.

Figure 2:
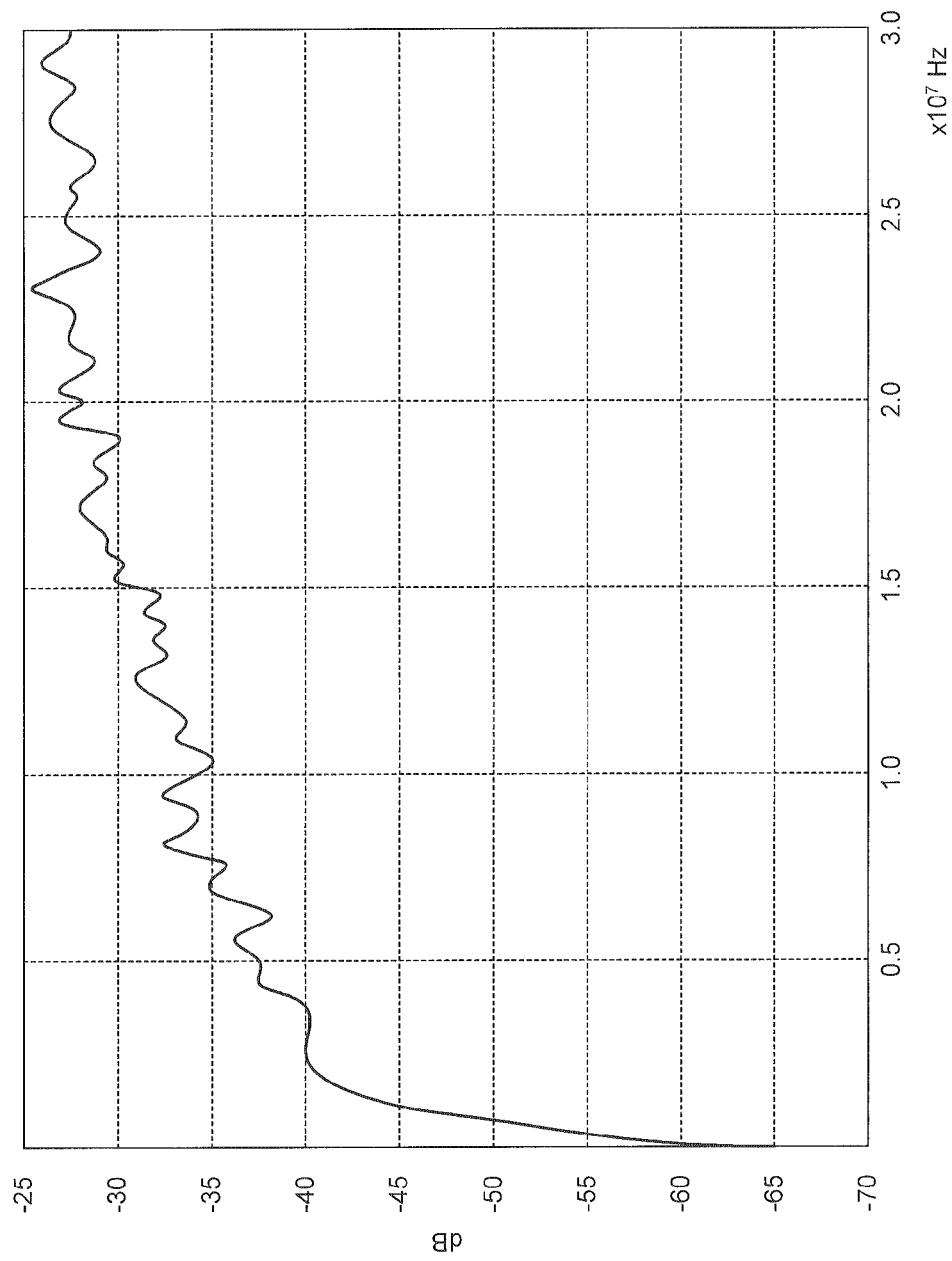
FIG. 2 is a typical FEXT channel response from 0 to 30 MHz from a telco binder cable.

DMT systems use the discrete Fourier transform to break down the channel into a large number of parallel sub-channels (for example, ADSL1 uses a full tone set of 256 tones, VDSL2 uses a full tone set of 4,096 tones) that are closely spaced in the frequency domain. Vectored FEXT cancellation requires deriving FEXT channel responses between all users at many or all of the tones (also referred to as "frequency bins") in use. Measurements on DSL cables show that the incremental change between adjacent tones' FEXT coefficients is small. This does not imply that FEXT is approximately constant across all tones, but rather that FEXT changes relatively smoothly from one tone to the next. For example, FIG. 2 shows a typical FEXT channel response curve from 0 to 30 MHz from a telco binder cable. Sub-channel spacing in DMT-based DSL systems is typically on the order of 4 to 8 kHz. As can be seen, incremental changes in FEXT between nearby sub-cannels is relatively small even though there is large variation over the complete 0 to 30 MHz band.

Using previous FEXT cancellation techniques, a pre-canceller or post-canceller crosstalk cancellation value had to be derived for each tone of each user, where the derived crosstalk cancellation value is related to the FEXT interference coefficient in one or more ways. In most cases, the goal is a combined system in which the relationship between system inputs x and system outputs y is defined for downstream vectoring as y=HGx+n, where G is pre-applied to the input data, where the matrix product HG approximates a diagonal matrix, where H is a matrix containing the MIMO system transmission data values $H_{ij}$ discussed above, where G is a matrix of FEXT pre-canceller (pre-coder) coefficients $G_{ij}$ derived by the system, and where n is noise (or other uncorrelated distortion sources in the channel or electronics). For upstream vectoring, FEXT compensation is implemented as a post-canceller and y=G(Hx+n). For either downstream or upstream vectoring, one method for deriving G with full precision (that is, calculating each coefficient value of $G_{ij}$ with full precision) utilizes the matrix inverse, so that if the FEXT coefficient between user i and user j at tone k is $H_{ij}(k)$, the pre-canceller or post-canceller coefficient is $G_{ij}(k)=H_{ij}^{-1}(k)$. As will be appreciated by those skilled in the art, there are other methods to compute these crosstalk cancellation coefficients. However, because incremental change from $H_{ij}(k)$ to $H_{ij}(k+1)$ is small, embodiments of the present invention exploit the corresponding minor incremental variations of $G_{ij}(k)$ in consecutive tones.

In the disclosure herein, as will be appreciated by those skilled in the art, any examples of embodiments of the present invention given in connection with downstream vectoring and the provision of downstream FEXT data by a CPE (that is, FEXT data such as error signals collected by the CPE and sent back upstream to the DSLAM for further processing) can be applied equally to upstream vectoring, wherein the CPEs of a given group send test signal input data upstream to the DSLAM or other upstream-end device to generate FEXT data relating to upstream transmissions. The only material difference is that the benefits of reduced-memory transmissions to reduce upstream bandwidth usage are irrelevant because the FEXT error signals are received, observed, measured and/or collected by the DSLAM (or other upstream-end modems or devices) rather than the CPE modems.

A practical exemplary system can be defined as having 128 users using 2,500 tones, leading to 32 crosstalk cancellation coefficients per user (to cancel the 32 most significant FEXT sources for each user). Such a configuration operating with full precision for calculating and implementing inverse matrix G requires the storage of 10 million coefficients, each requiring approximately 20-32 bits. As will be appreciated by those skilled in the art, in such an exemplary system, materially reducing the bandwidth and memory required to transmit and store these coefficients represents a substantial benefit to such a system. Not only is total memory storage capacity/size in the DSLAM side equipment a concern, but also the coefficient memory bandwidth is a bigger concern in many cases. If this exemplary system uses a 4 kHz DMT symbol rate, 40 Giga-words of memory bandwidth are required (because each coefficient must be loaded for each DMT symbol). The two options for storage—on-chip and off-chip memory—both have drawbacks that negatively affect system performance. On-chip FPGA, ASIC, etc. embedded memory cannot cost-effectively handle 40 MB without compression. Off-chip memory with commodity DRAM has adequate storage space, but memory bus bandwidth between the DRAM and any processor(s) performing vectoring becomes an issue.

Figure 4:
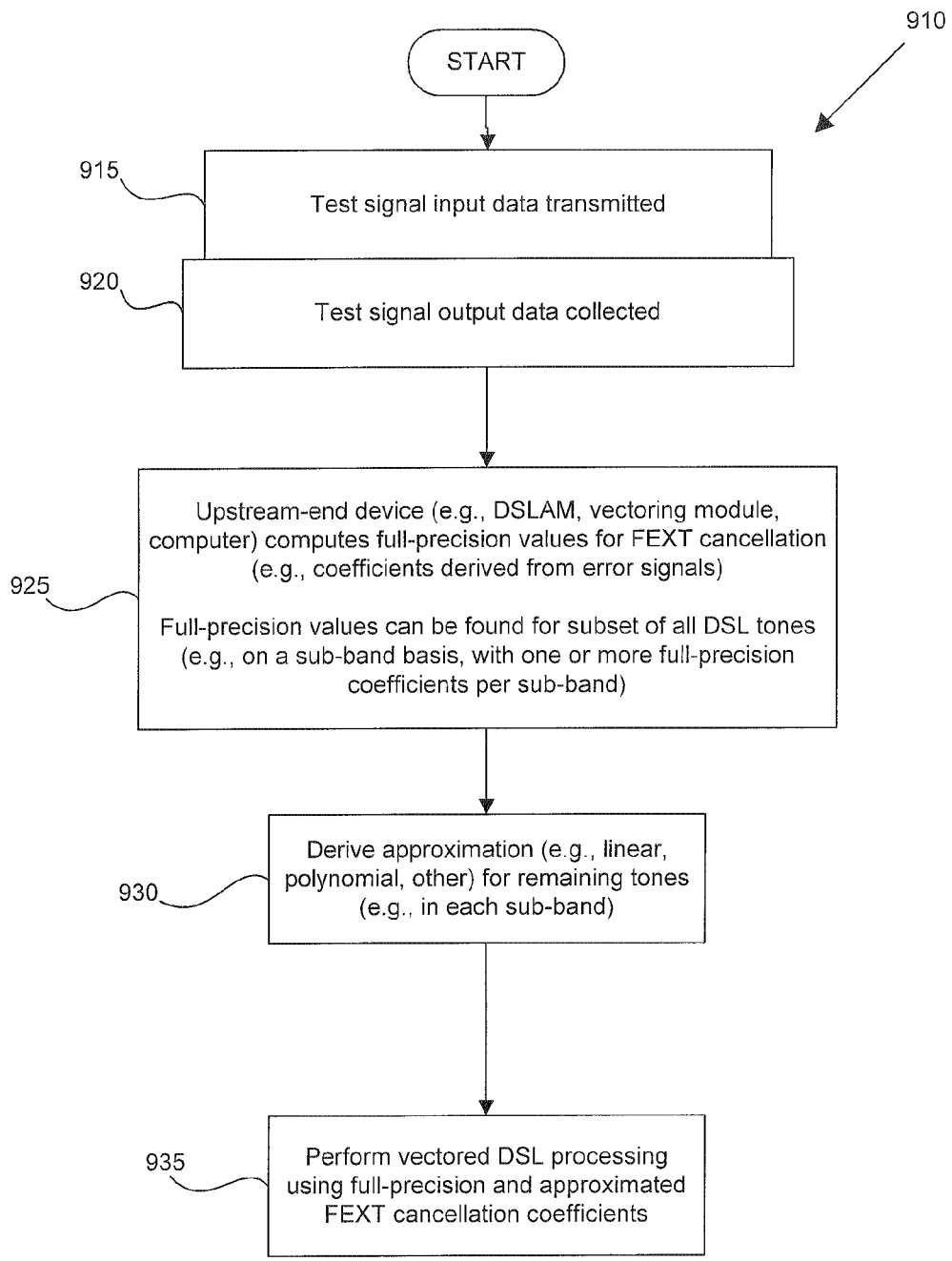
FIGS. 4 and 5 are flow diagrams of operation of DSL systems in which an approximation and/or differential/incremental value definitions of FEXT-related data are used to reduce bandwidth and/or memory storage demands.
Figure 5:
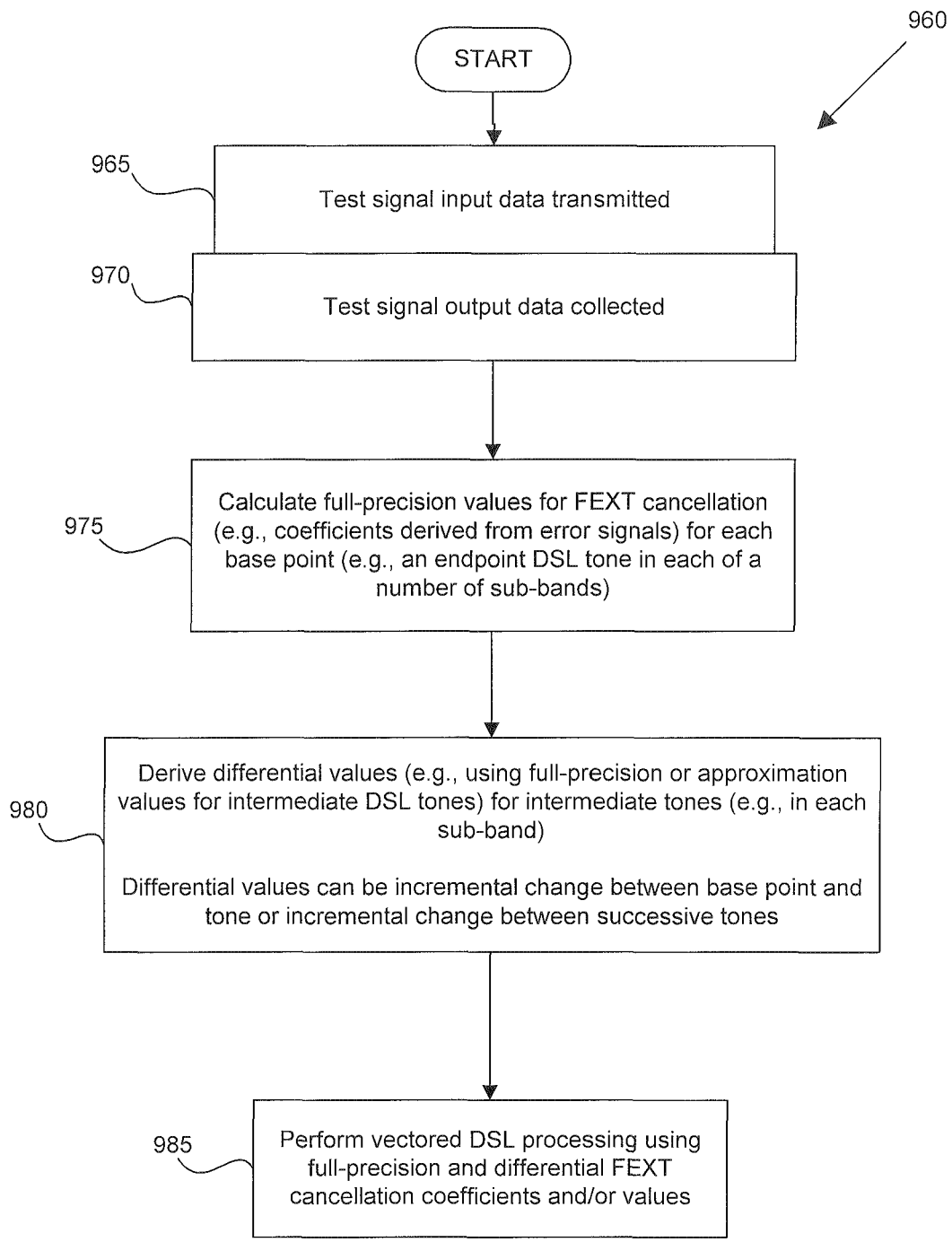

Various embodiments of the present invention, relying on the small incremental changes in consecutive values of $G_{ij}(k)$, provide reduced-memory vectoring data using either or a combination of two techniques. One technique uses differential-based coefficient definition based on incremental value differences between successive tones, thus greatly reducing the bandwidth and memory needed for use of a full-precision G matrix. A second technique involves using one or more approximations for $G_{ij}(k)$ between full-precision values of $G_{ij}(k)$, again greatly alleviating bandwidth and storage burdens while nevertheless implementing a reliable vectored DSL system. In other embodiments, the differential-based coefficient definition technique is combined with the use of the approximation technique to reduce bandwidth and memory storage needs. Embodiments of the present invention are illustrated in FIGS. 4 and 5, which illustrate one or more methods for reducing data transmission (both upstream/downstream and upstream-end-internal communication) bandwidth usage and memory storage.

In some embodiments of the present invention, a number of sub-bands are defined within a full set of DSL tones. The full set of DSL tones might be all tones used in the DSL system, or might be divided into a full set of downstream tones and a full set of upstream tones, or alternatively into a number of downstream or upstream frequency bands (each of which has a full set of tones). It should be kept in mind that when "all tones" are referred to, this phrase is to be interpreted as "substantially all tones" in light of the fact that a minimal number of tones in a given range, especially a large frequency range, might not be involved in data transmission, etc.

In embodiments of the present invention, each sub-band can have an equal number of tones, if desired, but this is not required in some embodiments of the present invention. For example, sub-band definition may change (for example, the number of DSL tones in each sub-band may change) on the basis of frequency band position. Higher frequencies suffer from different FEXT problems than lower frequencies, so having smaller sub-band sizes in higher frequency ranges might be appropriate. Other such variations will be apparent to those skilled in the art, and are deemed to be equivalents of the specific embodiments disclosed and claimed herein. In relatively simple implementations of an approximation system, some embodiments of the present invention break down the full set of tones used in a given DSL system (for example, 256 or 4,094 tones in an entire system, or a full set or frequency band used in just the downstream or upstream direction) into a number of sub-bands that each contain the same number of tones (or frequency bins). Using one or a small number of full-precision values for $G_{ij}(k)$ in each sub-band, approximations of the remaining tones' $G_{ij}(k)$ values are approximated and used. Through careful selection of an approximation model and definition, back-channel communication and memory storage requirements of such an approximation-based vectored DSL system can be reduced substantially. As will be appreciated by those skilled in the art, while $G_{ij}(k)$ is being used as the quantity for which full-precision and approximation values are being determined, other FEXT-related quantities/values (for example, $H_{ij}(k)$ or some proxy for one of these values, such as an error signal generated as a DSL line output at a modem) could equivalently be used instead.

In some simple embodiments a base point for a given sub-band is calculated to determine a $G_{ij}(k)$ full-precision value (for example, a 16-bit complex number representing the $G_{ij}(k)$ crosstalk cancellation value). A line approximating the remaining $G_{ij}(k)$ points in the sub-band is generated using consecutive sub-bands' base points. This linear approximation can thus be defined using a base point and slope to define the line on which $G_{ij}(k)$ approximation values (as opposed to full-precision values) are found. In an exemplary system, a full tone set of 4,096 tones can be divided into 256 sub-bands of 16 tones per sub-band. If a full-precision value is calculated for the first tone in each sub-band, then the remaining 15 tones' approximation values can be defined by a line connecting the first tone of the given sub-band and the first tone of the succeeding sub-band. In this exemplary system the CPE only needs to return the 256 full-precision values of $H_{ij}$ for the first tone in each sub-band, and can disregard the remaining 3,840 tones' $H_{ij}$ full-precision measurements during each FEXT channel determination and/or update. In a more generalized sense then, if the full DSL tone set has K tones (i.e., the 4,096 tones in the above example) that are divided using a decimation factor of p (i.e., the 16 in the above example, defining the number of tones in each sub-band) to create K/p sub-bands (i.e., 256 sub-bands in the above example), then p full-precision values are all that needs to be transmitted by the CPE to the DSLAM to generate the simple linear approximation, while the remaining p−1 (i.e., 15 above) tones per sub-band are approximation values. The DSL back-channel communication channel thus avoids having to transmit 3,840 other fully retracted position data points corresponding to the remaining (p−1)*K/p FEXT measurements per user that would be sent using an earlier system. Memory storage space requirements at the DSLAM-side are likewise reduced substantially.

Sub-band endpoints in the full DSL tone set can be defined as corresponding to tones pq for the number of sub-bands, where q is defined as q=1:K/p. The actual coefficients for endpoints $G_{ij}(pq)$ can be calculated and stored with full precision. Coefficient values of $G_{ij}$ between sub-band endpoints $G_{ij}(pq)$ then can be linearly interpolated to gain a linear approximation of the FEXT channel response coefficients between those endpoints. Thus the endpoints $G_{ij}(pq)$ and $G_{ij}(pq+p)$ can be used to approximate coefficients for $G_{ij}(pq+1)$, $G_{ij}(pq+2)$, ..., $G_{ij}(pq+q-1)$ on a straight line connecting the endpoints and having a slope that can be determined from the sub-band's endpoints. Each sub-band's entire set of crosstalk cancellation coefficients can then be defined in memory as a "start point" (for example, the sub-band's lower endpoint, a midpoint, or the upper endpoint) and a slope that is defined by the linear approximation values for that sub-band's tones. As will be appreciated by those skilled in the art, this technique does not require that a sub-band endpoint, per se, be used; the full precision FEXT channel response coefficient for a tone in the middle of a sub-band also can be used. As also will be appreciated by those skilled in the art, as the number of tones in each sub-band is reduced, the accuracy of the linear approximation is likely to improve. This allows the DSL system to balance improved FEXT approximation with memory usage.

Figure 3A:
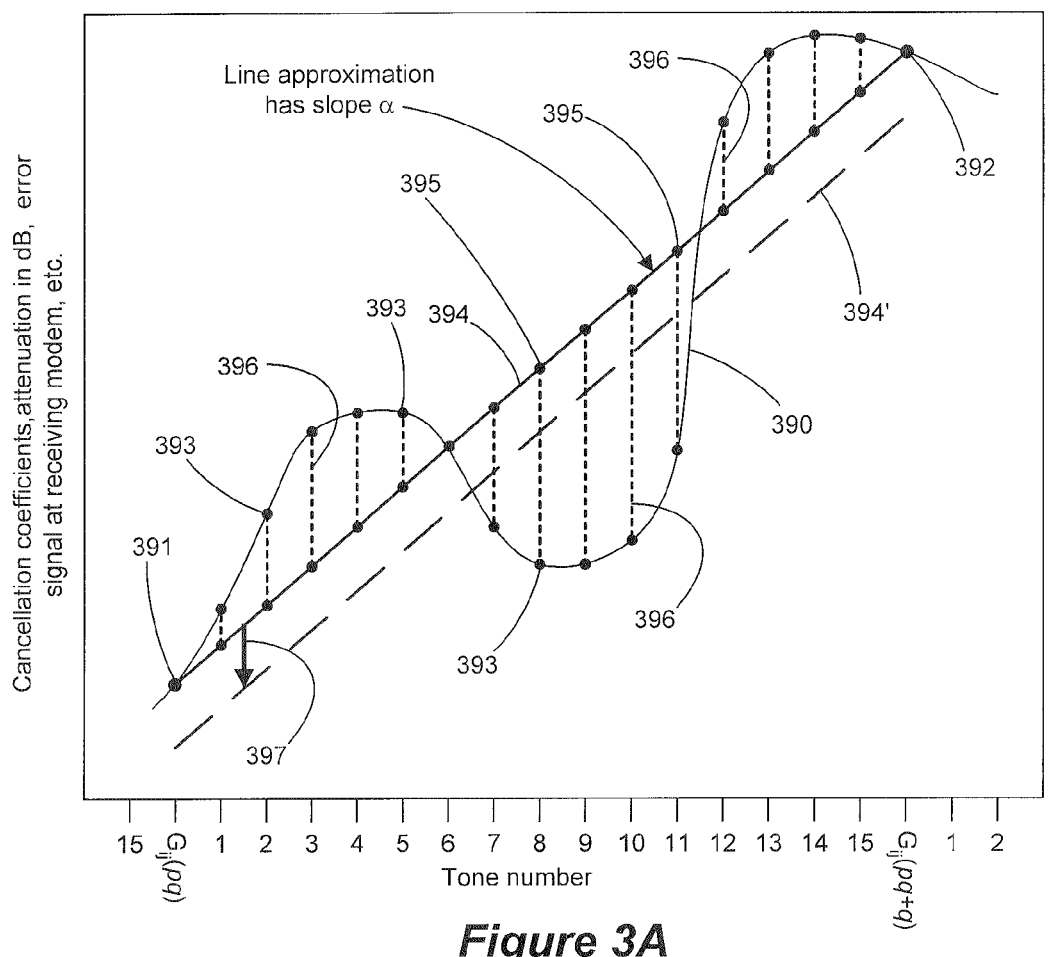
FIG. 3A illustrates one embodiment of the present invention employing a linear approximation of FEXT-related data.

FIG. 3A illustrates one or more embodiments using a simple linear approximation. The actual FEXT channel response 390 includes sub-band endpoints 391 and 392 corresponding to $G_{ij}(pq)$ and $G_{ij}(pq+q)$, respectively, in the DSL system's complete tone set. $G_{ij}(pq)$ to $G_{ij}(pq+q-1)$ define a sub-band of 16 tones and can be designated as sub-band q. In the example of FIG. 3A, because each sub-band is 16 tones, there are 15 intermediate tones that will use approximation values between each sub-band endpoint. Each of these 15 intermediate tones has its own full-precision $G_{ij}$ value 393 (for example, a dB or linear attenuation value, a crosstalk cancellation coefficient, etc.) on the actual FEXT channel response curve 390. In a simple linear approximation embodiment of the present invention, straight line 394 connects points 391 and 392 and is used as the linear approximation for the FEXT channel response in the defined sub-band q. A reduced-memory estimation of the FEXT channel response thus can be stored by using the starting point 391 for sub-band q, along with a slope a calculated for line 394 using its endpoints 391, 392. Each point 395 along line 394 can then be used for the FEXT channel response without having to transmit (from CPE to DSLAM), store and update all full-precision values for such intermediate tones for the entire DSL tone set. All that must be stored in memory in this basic linear approximation embodiment is the sub-band base point 391 (for example, a sub-band endpoint or midpoint) and the slope a for that particular sub-band's linear approximation. In some embodiments, the base point can be stored and the slope determined "on the fly" whenever it is needed. Of course, storing just the base point and slope simplifies memory access since each sub-band can be processed in parallel without having to cross-reference or cross-access memory contents. The base point and slope typically can be represented/stored as 16-bit complex numbers.

This basic linear approximation embodiment can be enhanced by calculating and storing/implementing a "line offset" to the linear approximation, wherein the line offset value moves the entire linear approximation (and thus all $G_{ij}(k)$ approximation values) a given constant value to achieve better error performance when compared to the full-precision FEXT crosstalk cancellation coefficient set the linear approximation is seeking to approximate. In this case, it again would be necessary to provide back-channel communication from the CPE side only with respect to only one tone per sub-band (that is, sending only a tone number and $G_{ij}$ coefficient value for each sub-band).

Using this line offset variation of the basic linear interpolation embodiment, the linear approximation of the FEXT channel response (or crosstalk cancellation coefficients) for a given sub-band can be evaluated for overall and/or aggregate error as compared to the actual FEXT channel response (or full-precision crosstalk cancellation coefficients) for that sub-band. If shifting the linear approximation line improves the aggregate sub-band error performance, then such a "shifting adjustment" can be made for the linear approximation of that sub-band and a "shift value" or "line offset" can be calculated and stored along with the endpoint and slope data. As illustrated in FIG. 3A, a line offset 397 is used to move line 394 to line 394' as an adjusted linear approximation for the FEXT channel response. Line 394' might be used, for example, when the FEXT channel response 390 (or set of crosstalk cancellation coefficients) contains substantially "higher" or substantially "lower" values over the relevant sub-band, so that the adjusted line 394' more accurately approximates the FEXT channel response with the line offset in use.

Figure 3B:
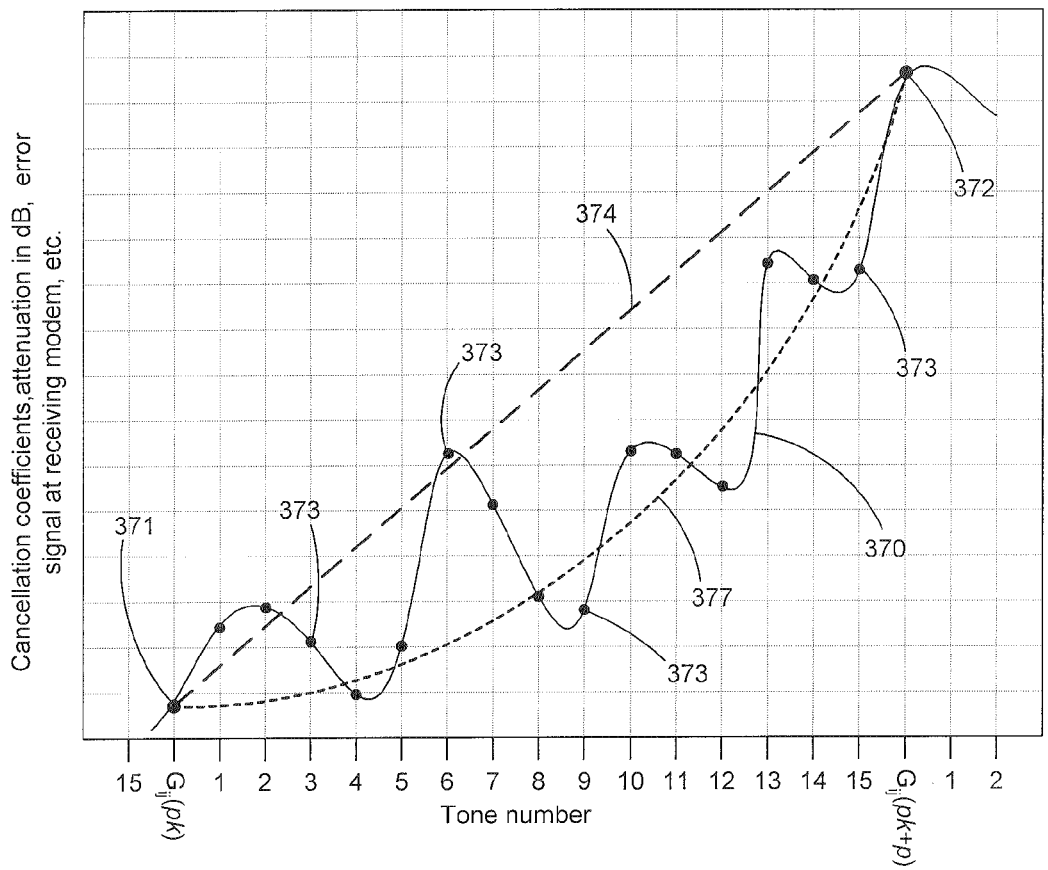
FIG. 3B illustrates one embodiment of the present invention employing a polynomial approximation of FEXT-related data.

Another embodiment of the present invention uses a polynomial approximation of the FEXT channel response (or set of crosstalk cancellation coefficients) rather than a linear-only approximation. As illustrated in FIG. 3B, the full-precision FEXT channel response 370 (or set of crosstalk cancellation coefficients) has points 373 for each intermediate tone in a sub-band defined by endpoints 371, 372. Linear approximation 374 provides the simple, first order approximation. However, a second order polynomial approximation 377 provides a close fit to the full-precision FEXT channel response 370 (or set of crosstalk cancellation coefficients). As with the linear approximation techniques above, this polynomial approximation 377 can be used by itself, with a curve offset constant, or with one or more error vectors to implement an appropriate estimation of the FEXT channel response 370 (or set of crosstalk cancellation coefficients).

The polynomial approximation can be obtained, for example, by using 3 points for a given sub-band. The two endpoints 371, 372 can be used, along with another full-precision point 378 on plot 370. As will be appreciated by those skilled in the art, given these three points in the sub-band's range of tones, any known fitting techniques can be used to generate a polynomial expression for use as an approximation. Therefore, in the polynomial expression:

$$G_{ij}(q+r)=G_{ij}(q)+\alpha_q*r+\beta_q*r^2$$

where r is the sub-band tone index (for example, r=0:15 in a situation where each sub-band is 16 tones), where $G_{ij}(q)$ is endpoint 371 in sub-band q, $\alpha_q$ represents sub-band q's linear component slope and $\beta_q$ represents the adjustment to the squared term for sub-band q. Here, each sub-band's index q would be stored with the sub-band's base point $G_{ij}(q)$ and polynomial expression coefficients $\alpha_q$ and $\beta_q$.

In another embodiment, an error vector (also referred to a "differential value vector" or "incremental value vector") is calculated and stored for each sub-band to represent a number of incremental adjustments, wherein each incremental adjustment is needed to a given value of $G_{ij}(k)$ to get to the next or another $G_{ij}(k)$ value on the FEXT channel response (or set of crosstalk cancellation coefficients) for each tone in the sub-band. Because the $G_{ij}(k)$ coefficients do not change dramatically within in a given sub-band, the error vector values can be represented in a relatively small number of bits when compared to the full-precision $G_{ij}(k)$ value for a given tone. That is, this error vector can be stored as a number of differential or incremental values representing each change in $G_{ij}$ from the previous tone in the sub-band, once again taking account of the smooth FEXT channel response (or set of crosstalk cancellation coefficients). Such an incremental value format can be even more memory efficient.

Figure 3C:
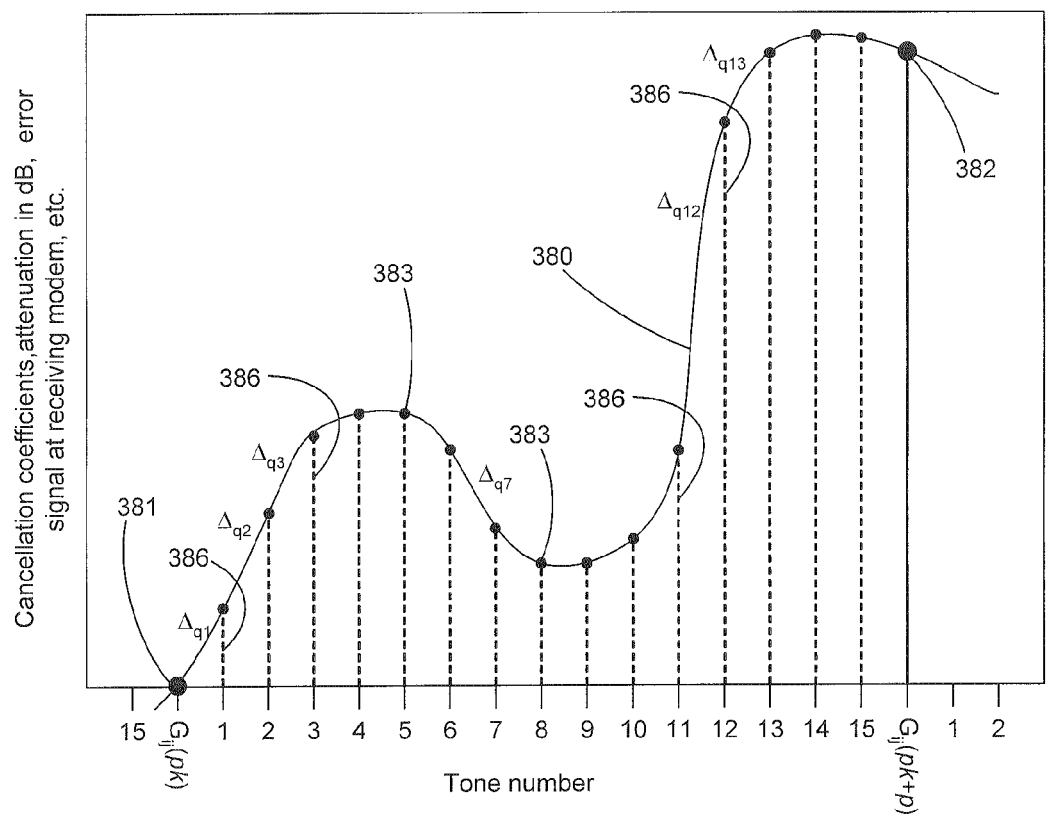
FIG. 3C illustrates one embodiment of the present invention employing a differential/incremental value plot and/or approximation of FEXT-related data.

Thus as seen in FIG. 3C, another reduced-memory embodiment uses the sub-band base point 381 and an incremental value vector $D_q$ for sub-band q having various incremental values $\Delta_{q1}$, $\Delta_{q2}$, etc. That is, base point 381 for sub-band q can be calculated using a full-precision value sent by the CPE after training Each intermediate tone in sub-band q can then be determined by adding the $\Delta_q$ value to the preceding tone's $G_{ij}$. Each incremental $\Delta$ value represents the difference between the desired point and either (1) the base point 381, or (2) the preceding point in the sub-band. To minimize the bit-wise data representation of the sub-band's vector $D_q$, the point-to-point differential technique means that only the difference between adjacent intermediate tones in a sub-band need be provided, not the difference between each such intermediate tone and the base point. Therefore, each point 383 can be reconstructed using the whole base point differential 386, or incremental changes to each point 386.

Full reconstruction permits reduced-memory storage burdens for DSLAM-side equipment, but does not help much with regard to FEXT data transmission from CPE to DSLAM. To utilize the differential/incremental value technique and realize more reduced-memory advantages, the differential/incremental value technique can be combined with one of the approximation techniques.

Using a subset of FEXT data points sent by the CPE, such as the sub-band endpoints or possibly a small number of points per sub-band (for example, 4 points per 16 tone sub-band), the DSLAM-side processor can construct smaller linear approximation models between fully retracted position points and use the differential/incremental value technique for determining intermediate tones within that structure. Memory might thus store $D_q$ (base point, slope, $e_{q1}$, $e_{q2}$, ..., $e_{q15}$) wherein each $e_{qd}$ is the incremental change value for an intermediate tone in the sub-band and wherein the "base point" might or might not be a sub-band "endpoint," per se. The $e_{qd}$ values are typically small due to the small dynamic range of sub-bands and thus could be represented using a relatively small number of bits. To further reduce memory demands, the $e_{qd}$ values can be stored in differential form not just relative to the slope line but also with respect to the previous $e_{qd-1}$ value in the sub-band, such that for example $e_2=e_1+\Delta_2$ and what is stored becomes (base point, slope, $\Delta_1$, $\Delta_2, \Delta_3, \ldots, \Delta_{15}$) where $e_1=\Delta_1$ and $e_i=e_{i-1}+\Delta_i$ for $i>1$.

This provides yet another approximation technique to reduce the memory needed for both communication of FEXT data as well as storage of FEXT data used for vectoring in the DSLAM side modems. As noted above, embodiments of the present invention can be used to realize advantageous compression of FEXT channel estimates and/or FEXT crosstalk cancellation coefficients. Moreover, these embodiments reduce memory requirements, reduce memory bandwidth usage and reduce sync symbol error communication from the CPE side during training and/or tracking.

To implement vectoring, each modem in a chassis must exchange real-time FEXT information with the other modems in the chassis (or even multiple chassis units). Typical DSL modems use a DMT symbol rate in the range of 4 kHz to 8 kHz, and FEXT cancellation must be done over the vectored bandwidth once per DMT symbol with a processing delay on the order of a few DMT symbols (or less) to avoid degrading the overall latency of the end-to-end modem system. This creates a complex and challenging data networking environment in which each line card shares real-time FEXT information from each of its modems with each of the other modems in the system (which might include modems on another line card or chassis in the system). In a typical DSLAM system, the communication flow of vectoring information can total tens of gigabits per second. Current generation DSLAM copper backplanes generally cannot handle this additional communication load, and future DSLAM copper backplanes need a practical method for managing this communication flow with reasonable complexity and operational performance.

A typical telephone cable or grouping of multiple cables terminating in one telco "central office," "CO," "node," "cabinet," etc. may contain anywhere from 50 to 2,000 (or more) twisted pairs, potentially spread among a dozen or more binder cables. As a result of telco deployment practices, modems assigned to twisted pairs in the same binder cable may not be connected to the same line card or DSLAM chassis. This occurs because telcos add line cards to a chassis (or add one or more additional chassis) as customers subscribe to DSL service. Modem ports are assigned on a "first-come-first-served" basis, rather than being grouped together based on user identity, downstream terminus location, etc. Even if the telco practices were different, it would be an operational (and error-prone) challenge to segregate phone lines according to binder of origin (a practice known as binder group management). Empirical cable measurements have shown that significant FEXT coupling can come from adjacent binders or even different cables that terminate in the same telco node due to the use of a "cross box" or patch panel in the telco node. These patch panels are used to map individual copper pairs (possibly from different binders or telco cables) to specific modem ports on the DSLAM line cards.

Another related issue is the practice of bonding multiple modem ports together. Bonding can increase the customer data rate in situations where a single modem port cannot provide the desired data rate. A customer who has started with a single modem port can have a second port added as an upgrade to provide additional services to the customer (the multiple-port DSL service thus has the potential to carry more data, operate at faster speeds, etc.). Many current systems require bonded modem ports to be connected to the same line card. This is impractical for most telcos for the same reasons that binder group management is impractical, as discussed above.

Finally, the computational demands of DSL vectoring—especially the real-time processing of crosstalk information in connection with user data signals—create data transmission and processing bottlenecks and other problems. The large volume of data that needs to be processed quickly (to reduce latency/delays) must be transmitted and processed efficiently. Embodiments of the present invention provide systems, apparatus and methods that provide such efficient handling and processing of these large amounts of data while having little negative effect on the latency and/or performance of the DSL lines being vectored.

Embodiments of the present invention include apparatus, systems, methods, etc. that eliminate or substantially reduce the communication bottlenecks that otherwise would confront vectored DSL systems. These embodiments are scalable, from small port-count systems (for example, a single line card system) up to much larger systems, with thousands of modem ports spread across multiple line cards and/or multiple chassis. Embodiments of the present invention work with both optical interconnect technologies (in the case of multiple chassis systems or line card upgrades to legacy chassis equipment) and also work with future copper interconnect technologies in which all communications flow within a single DSLAM on a copper backplane or using high bandwidth copper interconnect. Embodiments of the present invention also permit "virtual bonding" that allows telcos to virtually bond modem ports across multiple line cards and/or multiple chassis.

Figure 6A:
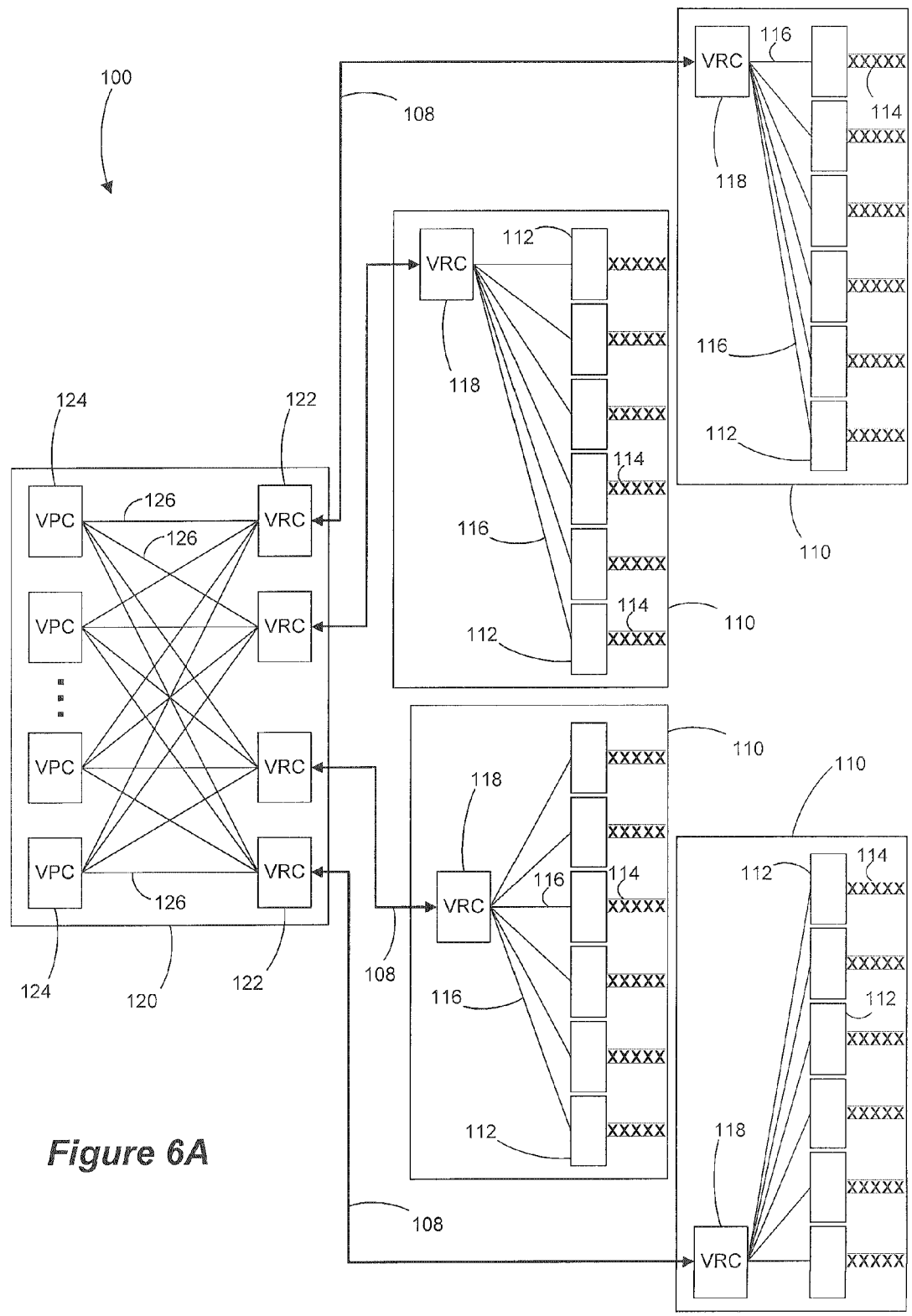
FIGS. 6A-6F are block diagrams of vectored DSL systems according to one or more embodiments of the present invention.

FIG. 6A illustrates a vectoring data communication system 100 in which line cards 110 contain DSL modems 112 (for example, multi-port devices) that control communications on twisted-pair lines 114. Multiple line cards 110 are connected via a high speed communication apparatus, such as XAUI lines 108 or the like in FIG. 6A, to a vectoring control entity (VCE) that can be or include a centralized vectoring module 120 (which can be, for example, a vectoring card). XAUI is the standard for extending the XGMII (10 Gigabit Media Independent Interface) between the MAC and PHY layer of 10 Gigabit Ethernet (10 GbE) and such high-speed data communication lines 116 can be used to connect modems 112 to line card vector router components (VRC-Ls) 118. The VRC-Ls 118 form an abstraction layer for the modem 112, as the modem 112 needs to connect to only one VRC-L 118 and the complexity of the specific vectoring deployment (for example, number of ports, line cards, etc.) is thus hidden from each modem 112.

The vectoring data flow from each modem 112 to its respective VRC-L 118 includes frequency domain samples for downstream and upstream communications—that is, IFFT-input transmit (TX) data for downstream vectoring and/or FFT-output receive (RX) data for upstream vectoring. The data returned to each modem 112 from the vectoring module 120 via a VRC-L 118 is the modem's crosstalk-adjusted (that is, vectored) IFFT-input and/or FFT-output data that is conditioned and/or processed to prevent and/or remove crosstalk interference from other vectoring system modems. The VRC-L 118 in each line card 110 acts as an interface between that line card's modems 112 and the vectoring module 120. High-speed communication lines 108 (for example, 10-40 Gbps or higher optical or copper interconnect) network a VRC-L 118 on each line card 110 to a companion VRC-V 122 on the vectoring module 120. 10-40 Gbps is a common data communication requirement that can be implemented between the vectoring module 120 and each line card 110.

Today this would mostly likely be an aggregation of 5 Gbps or 10 Gbps XAUI lines or similar, whether over the electrical backplane or the optical cable.

The VRC-Vs 122 on vectoring module 120 subdivide the modem vectoring data stream into sub-bands for subsequent crosstalk cancellation in one or more vector processors (VPCs) 124, as defined by system requirements. The vector processors may also be referred to as "vector processor components," "computational devices" and/or the like. That is, data is removed from a normal (that is, non-vectored) data stream in each modem and is reorganized into data bundles defined by frequency characteristics so that the data can be crosstalk-processed on a frequency basis (for example, tone-by-tone, groups of tones, etc.). Once processed, the data is then again reorganized from the frequency-based bundles used for crosstalk-removal processing and is reassembled for transmission/use by the modems.

For example, upstream and downstream bands can be vector routed by one or more VRCs (for example, a VRC-L/VRC-V pair) to individual VPCs. A vector router is a specialized data networking device or subsystem that implements a specialized "private" data network, which can be similar to an Ethernet network, for the purpose of efficiently moving vectoring data between modems and vector processors to avoid processing or data transmission bottlenecks. Packets of vectoring data can contain headers and/or other state information enabling efficient routing of the vectoring data over the data network without the need for dedicated links between each modem and vector processor device. To this end, a vector router also converts vector data packets from a format readily supplied by the modems into a format that is naturally utilized by the vector processors, then converting back again after vectoring has been performed (for example, interleaving and de-interleaving of the modem vectoring data stream). This task may be split between VRC-Ls and VRC-Vs, or performed in only one or the other, depending on the configuration. Alternately, VPC assignment can be based on evenly spaced sub-bands (independent of upstream and downstream band allocation). Data transmission between VRC-Vs 122 and VPCs 124 on the vectoring module 120 can be performed using high speed interconnect lines 126 (for example, XAUI or the like).

The exemplary packet structure illustrated in FIG. 16 allows for real-time vectoring of data between a number of DSLAM-side modems (for example, VTU-Os) and a vectoring control entity (VCE). Request packets containing payload data in the form of unprocessed user data (that is, user data for which crosstalk effects have not been compensate—also referred to as "uncorrected" data or signals herein) for vectoring are sent to a vector processor or the like, where vectoring processing compensates for crosstalk effects in the unprocessed user data DSL signals. The processed DSL data is then repacked as payload data and sent in reply packets back to the respective modems that supplied the unprocessed user data (request and reply packets typically use similar configurations). A packet is constructed (for example, by the VRC-L) with non-vectored data sent from every modem, and this packet is sent for vectoring processing once per symbol for each tone and modem/port range. Essentially, non-vectored data sent to a VPC gets unpacked, vectoring processed, re-packed in reply packets that are similar to the non-vectored data packets, and subsequently transmitted back to modems in reply packets, which return vectored data in the same format as the non-vectored data that was transmitted by the modems. The packing and unpacking of data by a VRC-L or the like follows the line card and/or modem port map so that vectored data is returned to the modem/port from which its corresponding non-vectored data was extracted (that is, request packets and reply packets can be identified by their modem or modem port of origin).

Other types of packets can be used in connection with embodiments of the present invention. For example, along with the vector data packets described, vector error packets, vector configuration packets and vector control packets can be sent throughout the vectoring data network to configure, adjust, etc. the vectored DSL system as appropriate (for example, to configure, control or synchronize modems chips or to configure, control or synchronize vector processors). Any of the packets described herein can include one or more modem port identifiers, a modem chip identifier, a line card identifier, a chassis identifier, or information identifying at least one DMT tone range so that tracking and addressing of the packets is achieved.

For vector request packets, the payload data can include inverse fast Fourier transform samples for a plurality of modem ports and tone sets identified in the request packet header, fast Fourier transform samples for a plurality of modem ports and tone sets identified in the request packet header, downstream frequency domain data for a plurality of modem ports and tone sets identified in the request packet header, and/or upstream frequency domain data for a plurality of modem ports and tone sets identified in the request packet header. Additional fields and components of the packet can be utilized (for example, a cyclic redundancy check or CRC). A vector error packet can include upstream training error samples for the modem ports and tone sets identified in the request packet header, upstream tracking error samples for the modem ports and tone sets identified in the request packet header, upstream DMT sync symbols for the modem ports and tone sets identified in the request packet header, downstream training error samples for the modem ports and tone sets identified in the request packet header, downstream tracking error samples for the modem ports and tone sets identified in the request packet header, and/or downstream DMT sync symbols for the modem ports and tone sets identified in the request packet header.

The embodiment of FIG. 16 shows the vectoring data packet format defined for modems serving N ports and vectoring data transmitted to/from the modems over the DSL vectoring data network (also referred to as the "private network," "routing subsystem," "vector routing network," "special network" or the like) has this format. The VRC-L adds a header on such a packet to identify the modem chip and line card, so the source of the data is known as the packet flows to the VRC-V (or, if no VRC-V is on the vectoring card, then to whatever destination is used in the vectoring card) and then on to the VPC/VPU. As vector-processed data comes back from the vectoring card to the VRC-L (or, if no VRC-L is used, then to the modems from which the vectoring data was extracted and transmitted), this header is removed before distributing the packets back to the appropriate modem chips. The VRC-L and/or VRC-V may optionally re-assemble packets from multiple modem chips into a format for use by the VPCs, depending on how the modems provide the data. Use of such packets and headers (coupled with vector router use in some embodiments) allows the vectored DSL system to scale to larger (or smaller) numbers of ports, and no hardwired/dedicated data bus is required between each modem and vector processor. Appropriate error signal packets and configuration and control messages also can flow over the network accordingly.

The VRC pairing configuration 118, 122 effectively converts data consideration from a per-port modem basis to a per-band (or per-frequency-set) VPC basis, at least for crosstalk cancellation pre-processing. Because crosstalk cancellation is most effectively and easily performed in the frequency domain on a per-tone, per-band or per-tone-set basis, this conversion greatly reduces the complexity of the vectoring system's implementation. Matching sub-bands (that is, groupings of the same one or more frequencies, referred to as "tone groupings," "tone sets," "sub-bands" and the like) from every modem 112 in the vectoring system 100 are collected and aggregated to enable crosstalk cancellation inside a VPC 124 between each victim modem and any set or subset of disturber modems.

As will be appreciated by those skilled in the art, the sub-bands assigned to each VPC 124 do not have to consist of contiguous frequencies in the system. For example, if there are 6 VPCs 124 in vectoring module 120, each consecutive VPC 124 may take the next frequency or frequency bin, meaning that the "first" VPC 124 will get frequencies 1, 7, 13, 19, etc. and the "fourth" VPC 124 will get frequencies 4, 10, 16, etc. Alternately, each VPC 124 can be sent a tone set, for example groups of 8 tones each, so that the first VPC 124 gets tones 0-7, the second VPC 124 gets tones 8-15, etc. Such distributions of data can provide a more "even" usage of available resources, for example preventing "clogging" of one or more given communication lines 126 due to a data dump from the relevant VRCs 122 to a single VPC 124 while the remaining VPCs 124 and lines 126 are idle.

The data on the private vectoring data network of system 100 consists of special purpose packets identifying the source modem 112 and destination VPC 124. Alternatively, the source and destination address can be implied by the packet timing. Each packet consists of IFFT input (and/or FFT output) data for one sub-band to/from one modem 112. Because DMT-based DSL systems operate using a DMT symbol period (for example, 4 kHz or 8 kHz), data communications from the modems 112 to the VPCs 124 and back again are repeated for every DMT symbol, possibly using pipelining of the communication and computation to use available networking bandwidth and computational resources more efficiently. Per-tone training/tracking error signals, diagnostic data to/from the modems 112 and other configuration and/or management data can use the same networking communication path and packet structure.

Various hardware devices and/or components can be used to implement embodiments of the present invention. Various current FPGAs and the like are suitable for constructing configurations according to embodiments illustrated herein. For example, Altera Stratix IV GX FPGA devices (e.g., EP4SGX70, EP4SGX110, EP4SGX230, etc.) are appropriate for such implementations. In some embodiments of the present invention, each VPC 124 is a separate chip (FPGA, ASIC, etc.) on which are programmed multiple VPUs as defined below. Other hardware configurations will be apparent to those skilled in the art.

Figure 6B:
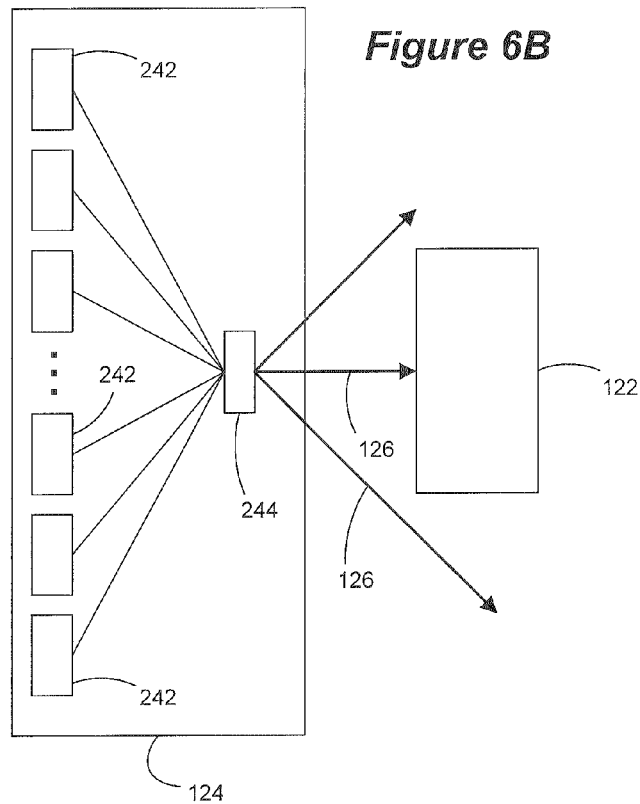

As illustrated in FIG. 6B, each VPC 124 contains or implements one or more dedicated vector processing units 242 (VPUs), each of which performs vectoring for a subset of the modems and/or disturbers. Allocation and/or sharing of the VPU resources may be advantageous in some cases and can be accomplished in various ways. For example, each VPC 124 can contain a centralized set of VPUs 242 that are time-shared among all of the modems 112 for vectoring within a given sub-band. Alternately, each VPC 124 can contain a distributed set of VPUs 242 in which each VPU 242 is dedicated to a particular modem 112 within the sub-band assigned to the VPC 124. Multiple VPUs 242 can coordinate communication between their host VPC 124 and one or more VRC-Vs 122 using a VPU dispatcher 244 or the like.

A VPU 242 processes all of the IFFT/FFT data for a tone set (for example, a single tone, a group of tones, a band or sub-band of tones, etc.) for all of the modems making up the vectored DSL system. The VPU 242 processes this data once per DMT symbol, in a somewhat periodic manner. As noted above, in some embodiments, each VPC 124 is a collection of one or more VPUs 242, where each VPU 242 independently processes its batches of tones without any explicit communication with other VPUs 242. In a simple exemplary setting, a system might use 4096 tones, 2 VPUs, and N modems. Each VPU 242 handles tones in batches of 16 tones. Tones can be assigned to VPUs as follows:

VPU0: tones 0-15, 32-47, . . . .
VPU1: tones 16-31, 48-63, . . . .

In this example, the modems provide their FFT/IFFT data to the VRC-based private network in tone order from 0 to 4095. When the FFT/IFFT data gets routed to the VPCs, the VRC distributes data like "dealing cards" to the two VPUs in batches of 16 tones. This keeps the data networking pathway and VPUs uniformly busy without bottlenecks. For each tone, the VPU performs the equivalent of an N×N matrix multiply to perform vectoring (or maybe less than a full N×N multiply if the vectoring matrix is "sparse").

Each VPU has a pre-determined processing capability level (for example, number of complex multiplications per second), based on the logic design and chip technology utilized. Additionally, the required level of processing power "per tone" for the vectoring system will increase as the number of modems, N, increases. Thus, the required number of VPUs is a function of the number of modems in the system and the number of vectored tones over the DMT bandwidth. Therefore, systems with a large number of vectored tones and/or a large number of modems will consequently need a larger number of VPU resources (and consequently VPC chips) to perform vectoring. That is, as the number of modems increases in a vectored system, the number of tones that each VPU can process will decrease due to the additional modems' data that need to be processed. As will be appreciated by those skilled in the art, the size of each sub-band can be determined by cost and complexity limits for a given implementation, as well as the DSL band profiles that are supported by the design. For example, in an implementation for a system having a 17 MHz VDSL profile, 384 modems, and vectoring up to 64 disturbers per modem, a practical system would have on the order of 128 VPUs with each VPU processing 32 tones per DMT symbol. As the VPU logic is reconfigured to reflect any changing dimensions of the system (number of modems, number of vectored tones, etc.), vector routing is adjusted accordingly.

Figure 6D:
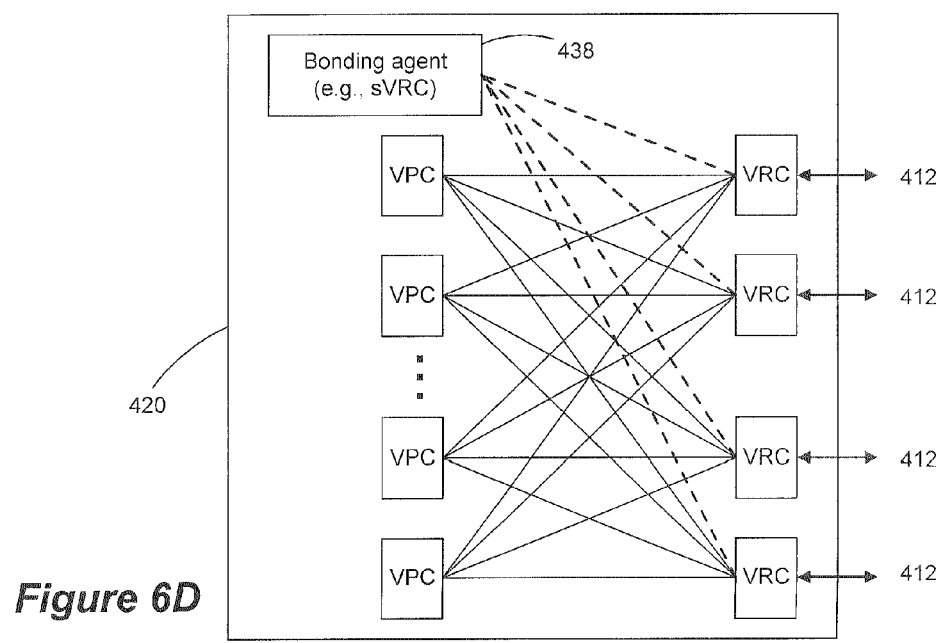
Figure 6C:
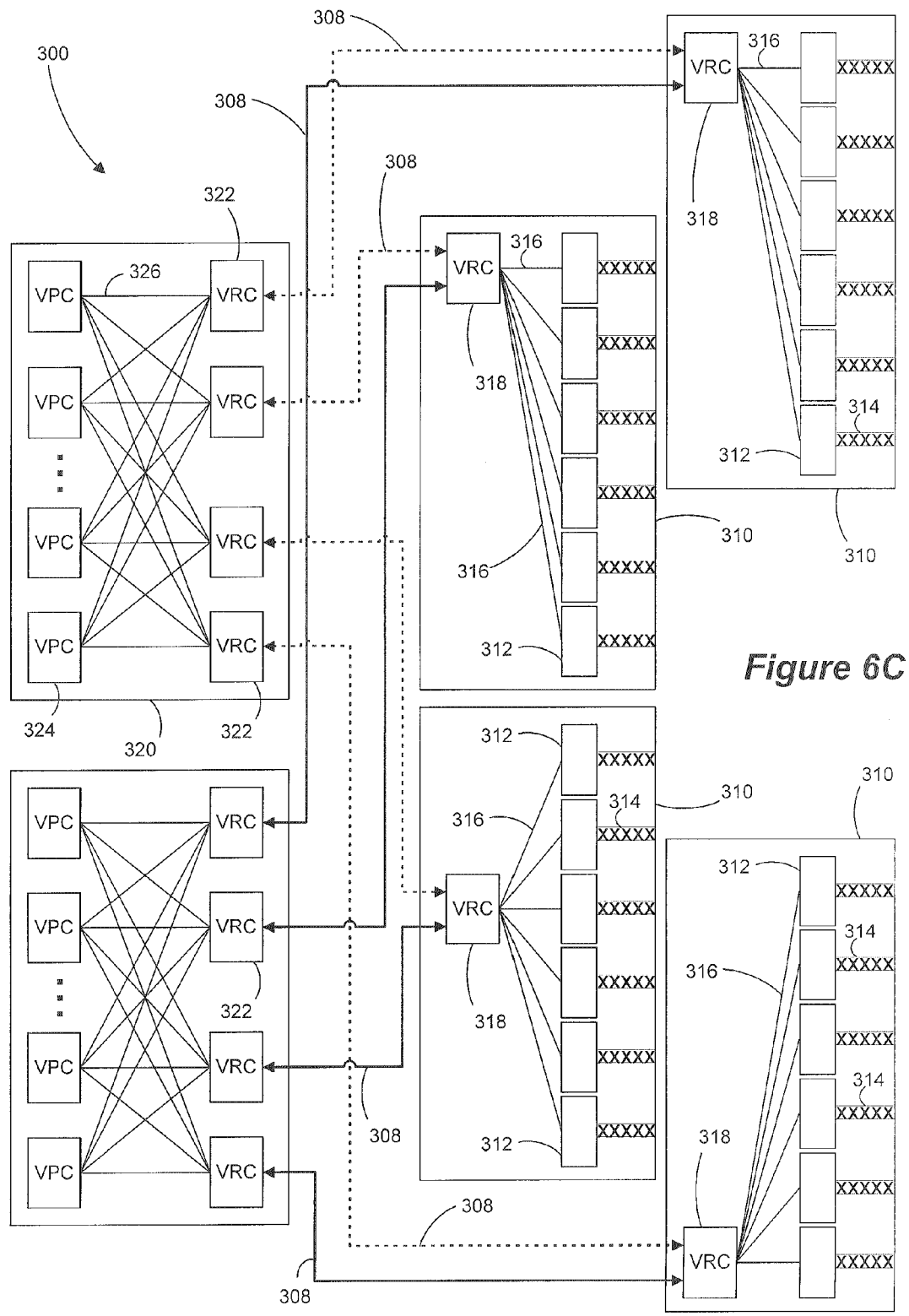

In embodiments of the present invention such as the one shown in FIG. 6C, the vectoring system 300 may exceed the practical complexity for a single card used as the vectoring module 120 (for example, power consumption, card area, etc.). The system illustrated in FIG. 6C permits splitting or allocating vectoring processing of system 300 onto multiple vectoring cards 320 (in a chassis, in a module or in multiple modules) where each card 320 performs crosstalk cancellation over some fraction of the total DSL frequency band. With this configuration, vectoring can be performed in systems with hundreds or even thousands of simultaneously operating modems. VPCs typically do not need to communicate with each other explicitly, although they will be roughly synchronized implicitly by the flow of the FFT/IFFT data and training signals coming from the modems.

In the embodiment of the present invention illustrated in FIG. 6D, the vectoring data transmission path from each modem 412 to a vectoring card 420 can be further utilized to serve a dual function and perform "virtual bonding." In addition to passing crosstalk cancellation data, each modem 412 in the bonded modem group (that is, two or more modems serving a user in a bonded fashion) can pass customer data streams (for example, IP packets) along this same communication path. One or more bonding routers 438 (acting as a supplemental VRC (sVRC), bonding agent and/or controller) on vectoring card 420 connect via VRC-Vs 418 to each VRC on its respective line-card. Each bonding router 438 performs routing between VRC-Vs and, thus, their respective VRC-Ls. This effectively creates a data path between and/or among any two or more modems in the vectoring system and multiple modem ports can then be bonded in the vectoring system, provided that one of the two modems performs the aggregation function and presents the total bonded data stream to the uplink path of the DSLAM, as will be appreciated by those skilled in the art.

Figure 6E:
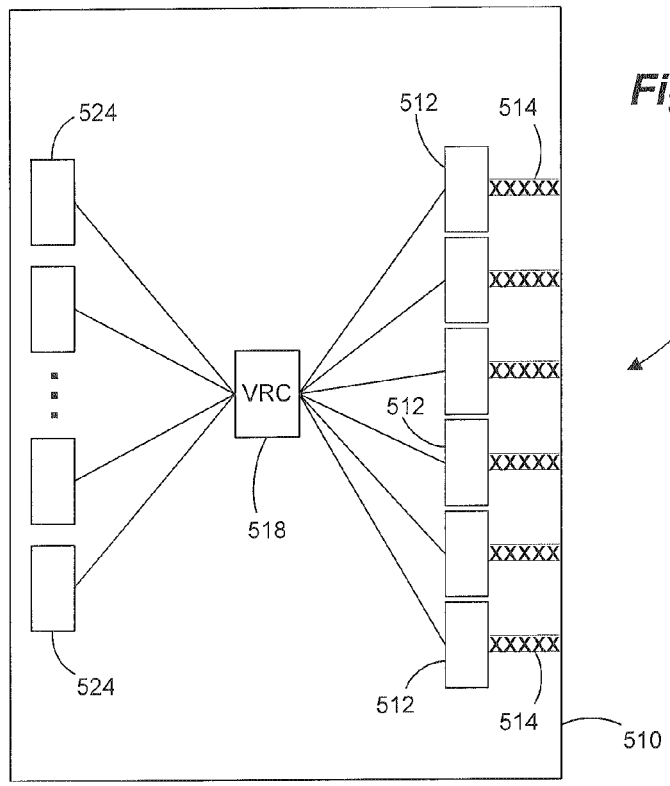
Figure 10A:
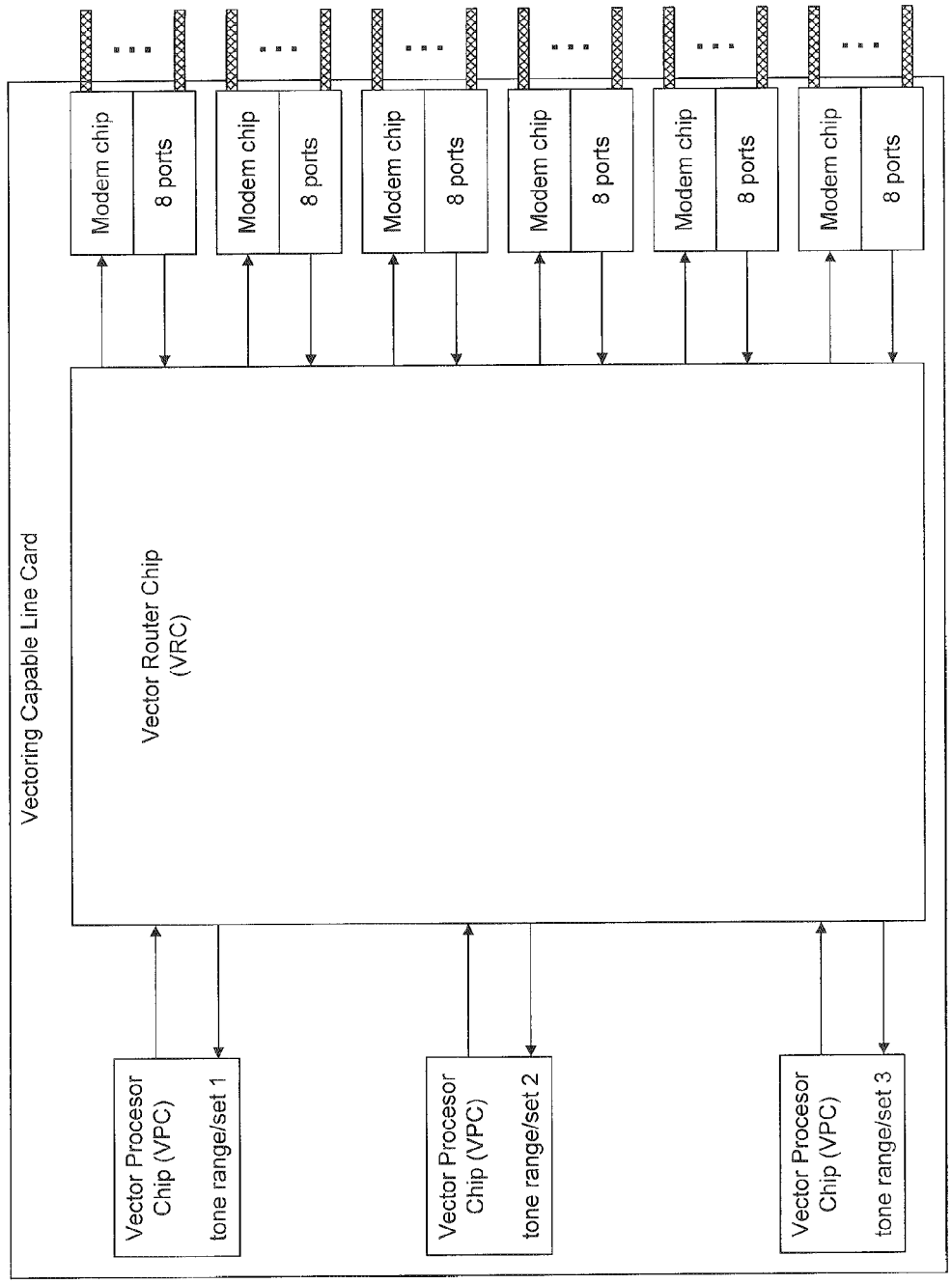
FIGS. 10A-10E are various block diagrams of vectoring data network configurations according to one or more embodiments of the present invention.

In yet another embodiment of the present invention illustrated in FIG. 6E, a simplified system 500 fits onto a single line-card 510 (see also FIG. 10A). Once again, VRC resources 518 (a single VRC, for example, or alternately two VRCs back-to-back) provide routing between modem ports and the VPCs 524 that provide processing of designated sub-bands.

Figure 6F:
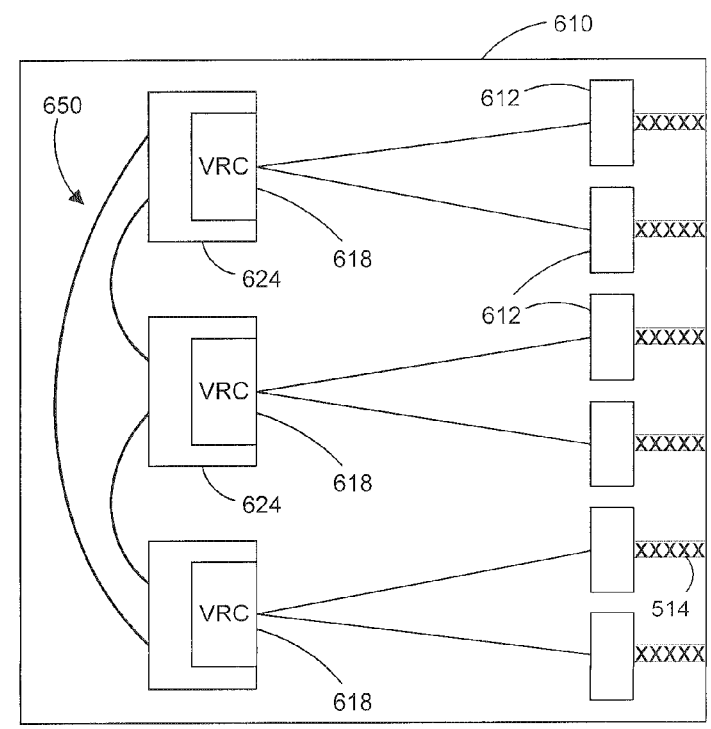

In low port-count systems with only modest networking communication bandwidth, the VRC functionality 618 can be situated directly inside each VPC 624, as illustrated in the embodiment shown as system 600 in FIG. 6F. For example, where an FPGA is used as the VPC 624, a portion of the FPGA configuration is dedicated to the routing functionality. In this case, the cost savings realized by removing an independent vector routing device from the system outweigh the additional communication requirements. FIG. 6F shows both daisy chain and mesh network connection options 650 between VPCs 624. In practice, one or the other would be utilized (not both) based on the communication requirements and tradeoffs for the system.

Figure 7:
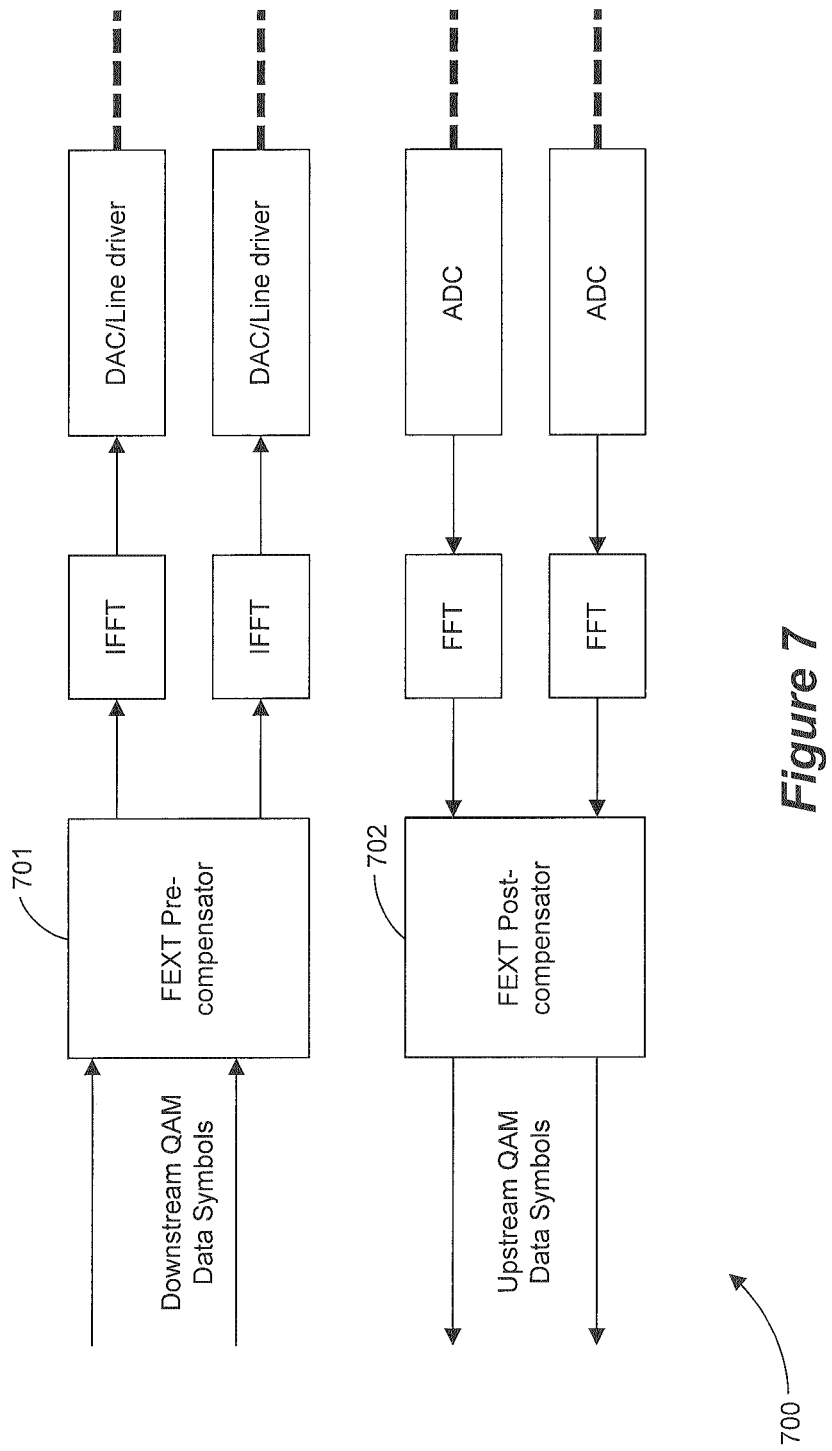
FIG. 7 is a block diagram of a DSL data processing stream in which embodiments of the present invention can be implemented.

FIG. 7 illustrates general operation of the vectoring operation 700, wherein efficient implementation of the downstream FEXT pre-compensator 701 and upstream FEXT post-compensator 702 can be accomplished using one or more embodiments of the present invention. In the downstream direction, a plurality of QAM data symbols from a plurality of modems is FEXT pre-compensated by coordinating or "vectoring" communication among all modems on a per-tone basis, followed by subsequent IFFT and digital-to-analog conversion operations on a per-modem basis to transmit the FEXT-compensated signal onto the Telco copper pair. In the upstream direction, a plurality of received FFT samples is FEXT post-compensated by coordinating or "vectoring" communication among all modems on a per-tone basis, followed by subsequent decoding of the QAM data symbols on a per-modem basis.

Figure 8:
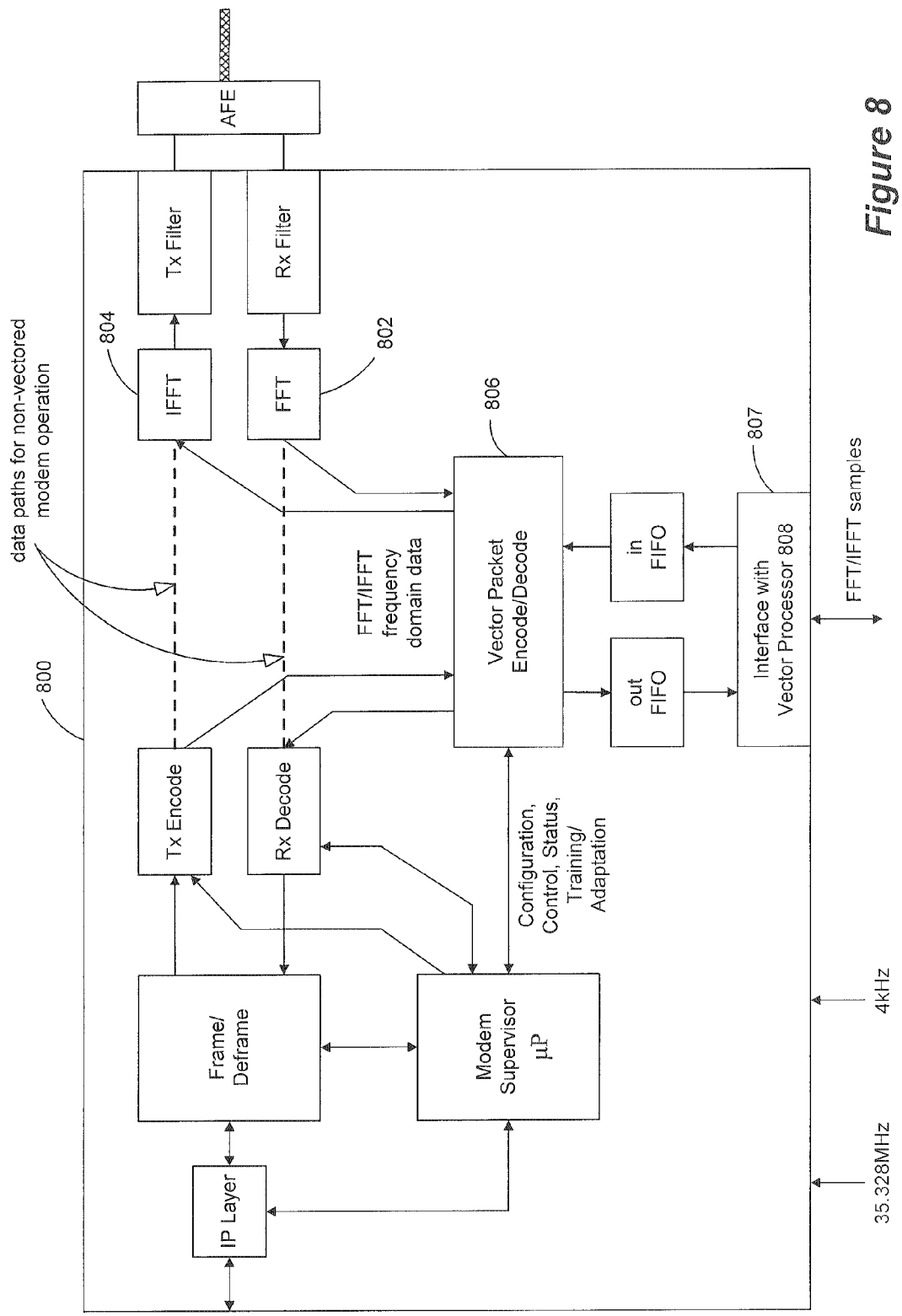
FIG. 8 is a block diagram of a DSLAM modem in which embodiments of the present invention can be implemented.

FIG. 8 shows a generic modem port for a commonly available DSLAM side VDSL modem device 800 that has been modified to support vectored communication using one or more embodiments of the present invention. The upstream FFT 802 outputs and the downstream IFFT 804 inputs are intercepted by a vector packet encoder/decoder 806 (or "vectoring data extractor") and sent to a vector processor 808 via interface 807 to allow vectoring of the data stream among all modems in the vectoring group. By removing, processing and "reinserting" data from the data stream, such a vector processor system may introduce a small number of symbols of latency in the modem's receive and transmit data paths.

Figure 9A:
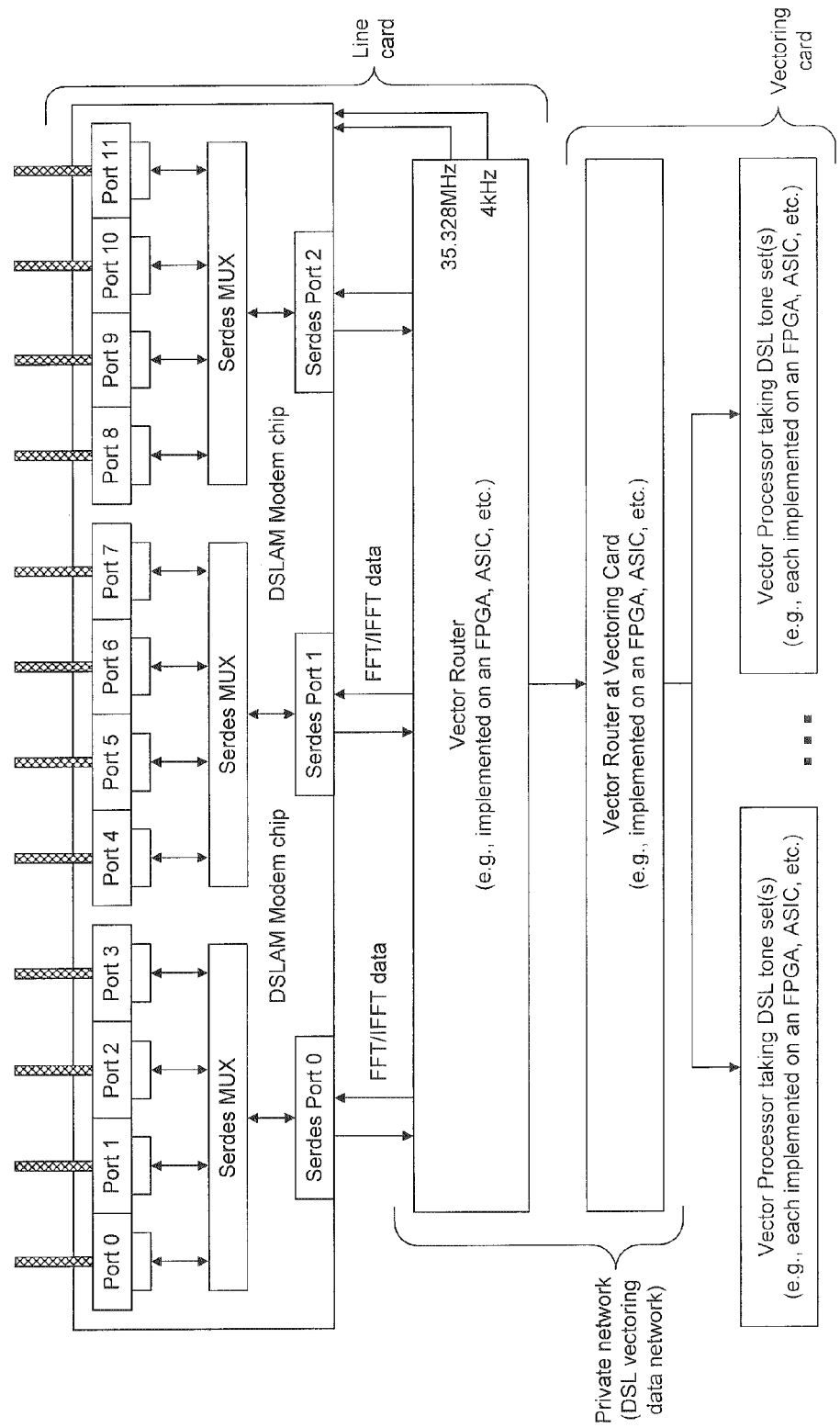
FIGS. 9A-9D are block diagrams of DSLAM modem chip interfaces with a vectored DSL system according to one or more embodiments of the present invention.
Figure 9B:
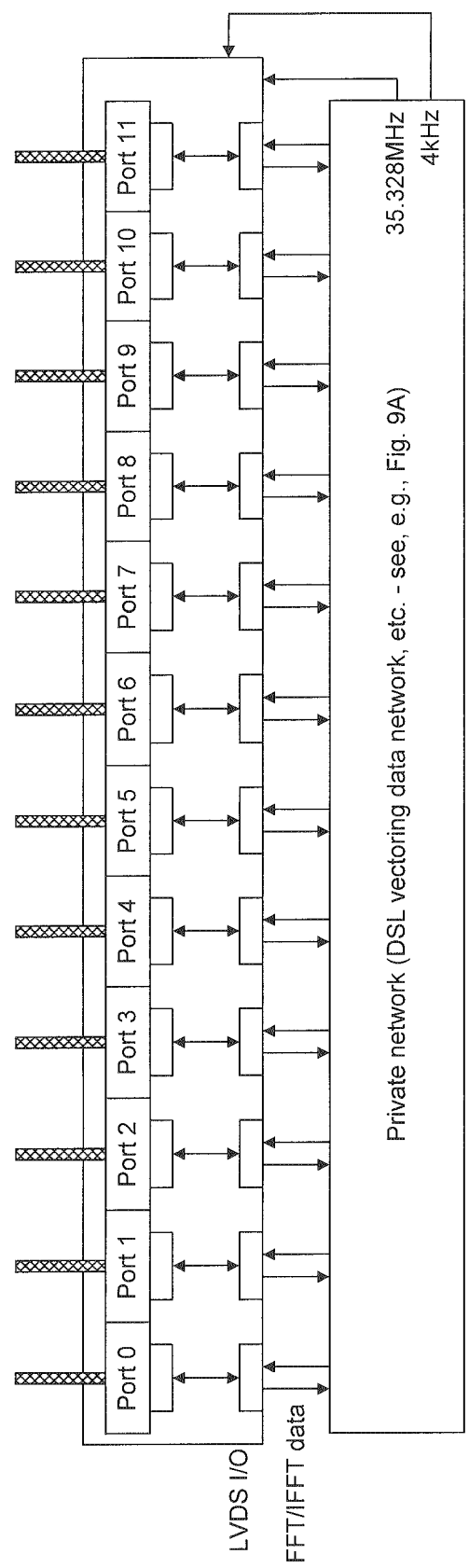
Figure 9C:
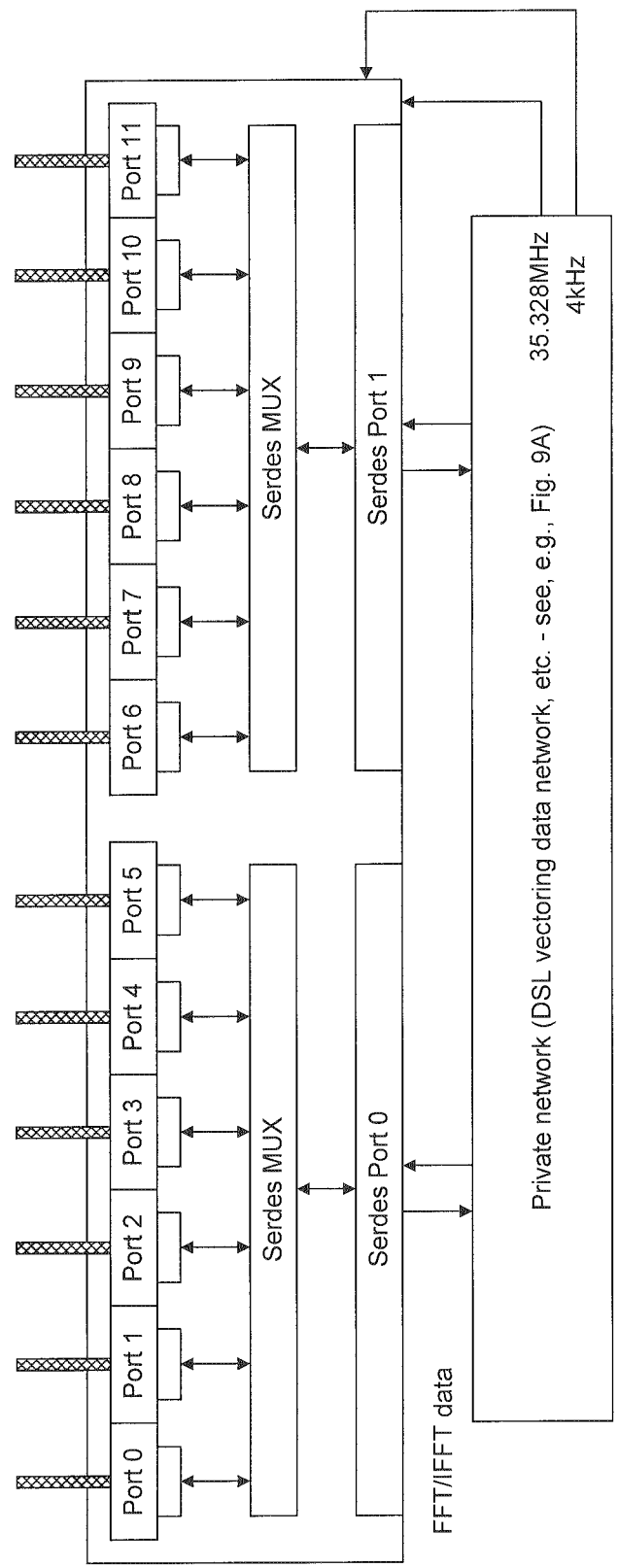
Figure 9D:
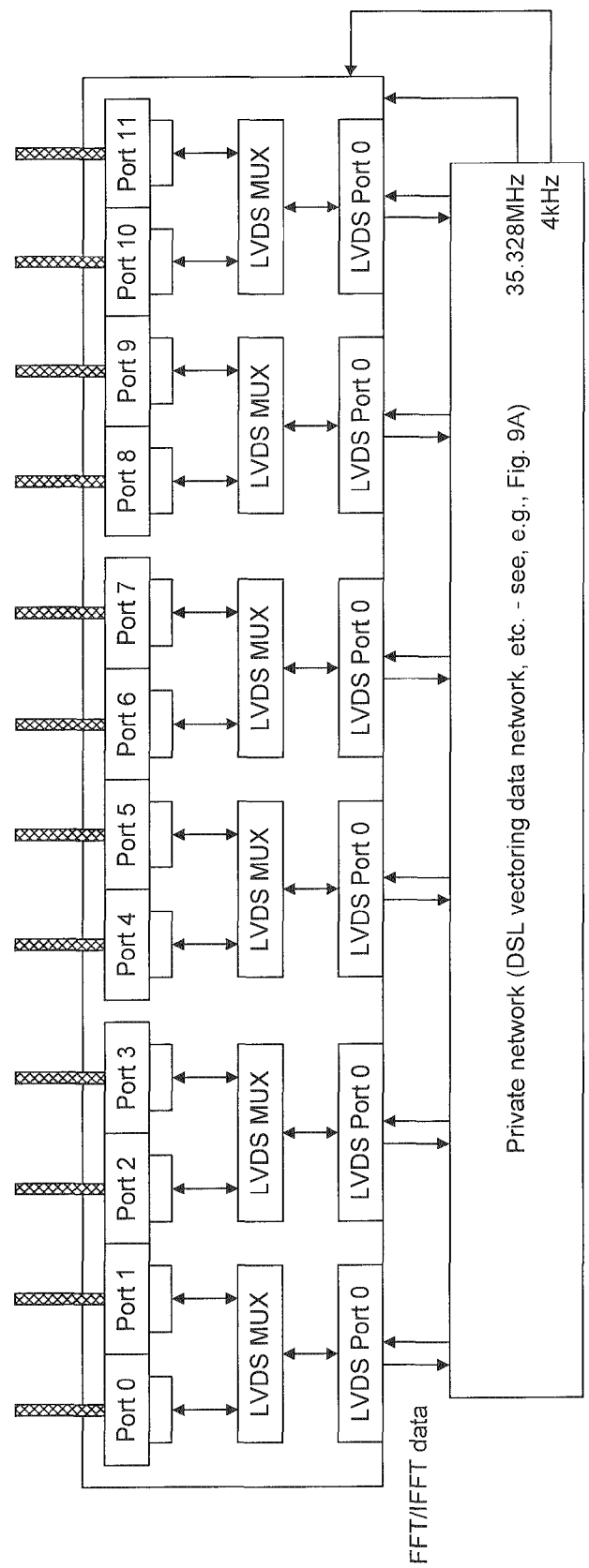

FIGS. 9A-9D provide several specific embodiments of a DSLAM side modem configuration for communicating with a vector processor chip, specifically showing possible interfaces between a modem chip and a VRC. FIG. 9A shows the configuration of a 12-port, ITU 993.2 Profile 30a profile vectored VDSL DSLAM side modem chip that supports vectoring (for example, a 5G serializer/deserializaer or "Serdes" type). In order to efficiently make use of I/O pins on the multi-port modem chip and reduce power consumption, a high-speed serial interface such as XAUI or the like can be used to aggregate FFT/IFFT data from each modem device over a single data networking link either directly to a vector processor chip or to a vector router chip for subsequent forwarding to a vector processor. FIG. 9B illustrates a 12-port, ITU 993.2 Profile 30a profile vectored VDSL DSLAM side modem chip that supports vectoring. In this embodiment, low voltage differential signaling (LVDS) interface circuits (1 LVDS per modem port) are used. FIG. 9C illustrates a 12-port, ITU 993.2 Profile 17a vectored VDSL DSLAM side modem chip that supports vectoring (for example, a 5G Serdes type). FIG. 9D illustrates a 12-port, ITU 993.2 Profile 17a vectored VDSL DSLAM side modem chip that supports vectoring (for example, a LVDS type, with 1 LVDS interface per 2 modem ports).

Figure 10B:
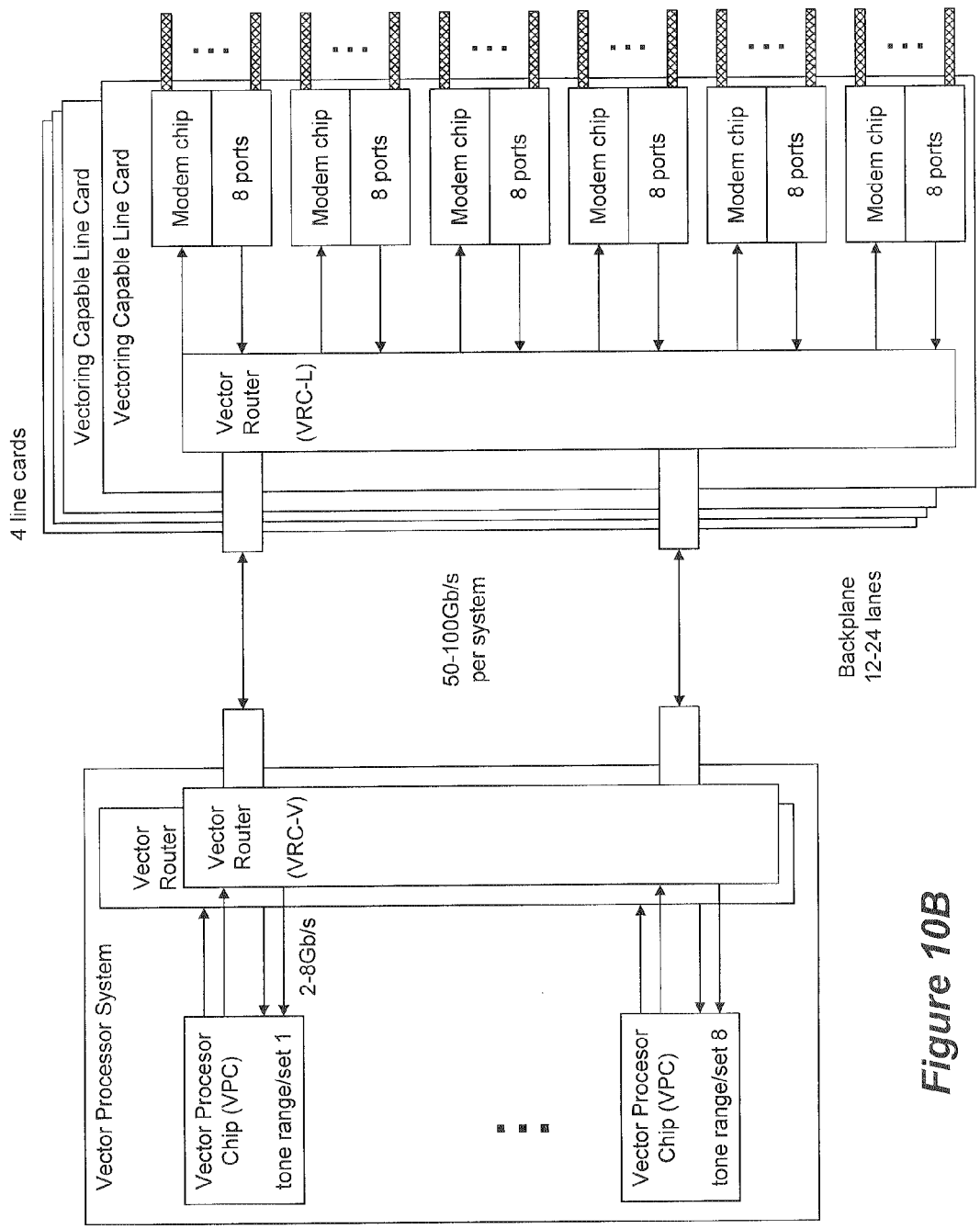
Figure 10C:
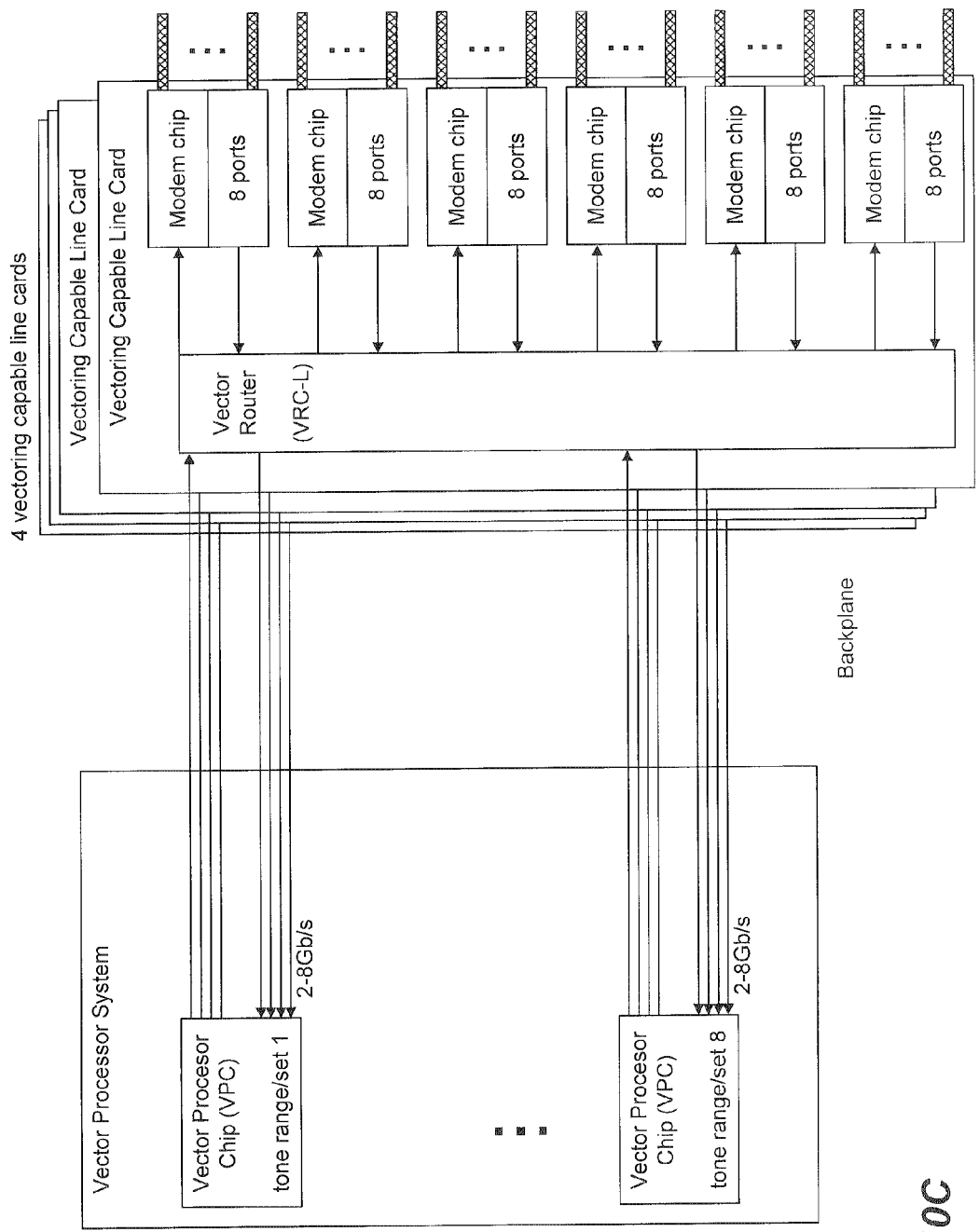
Figure 10D:
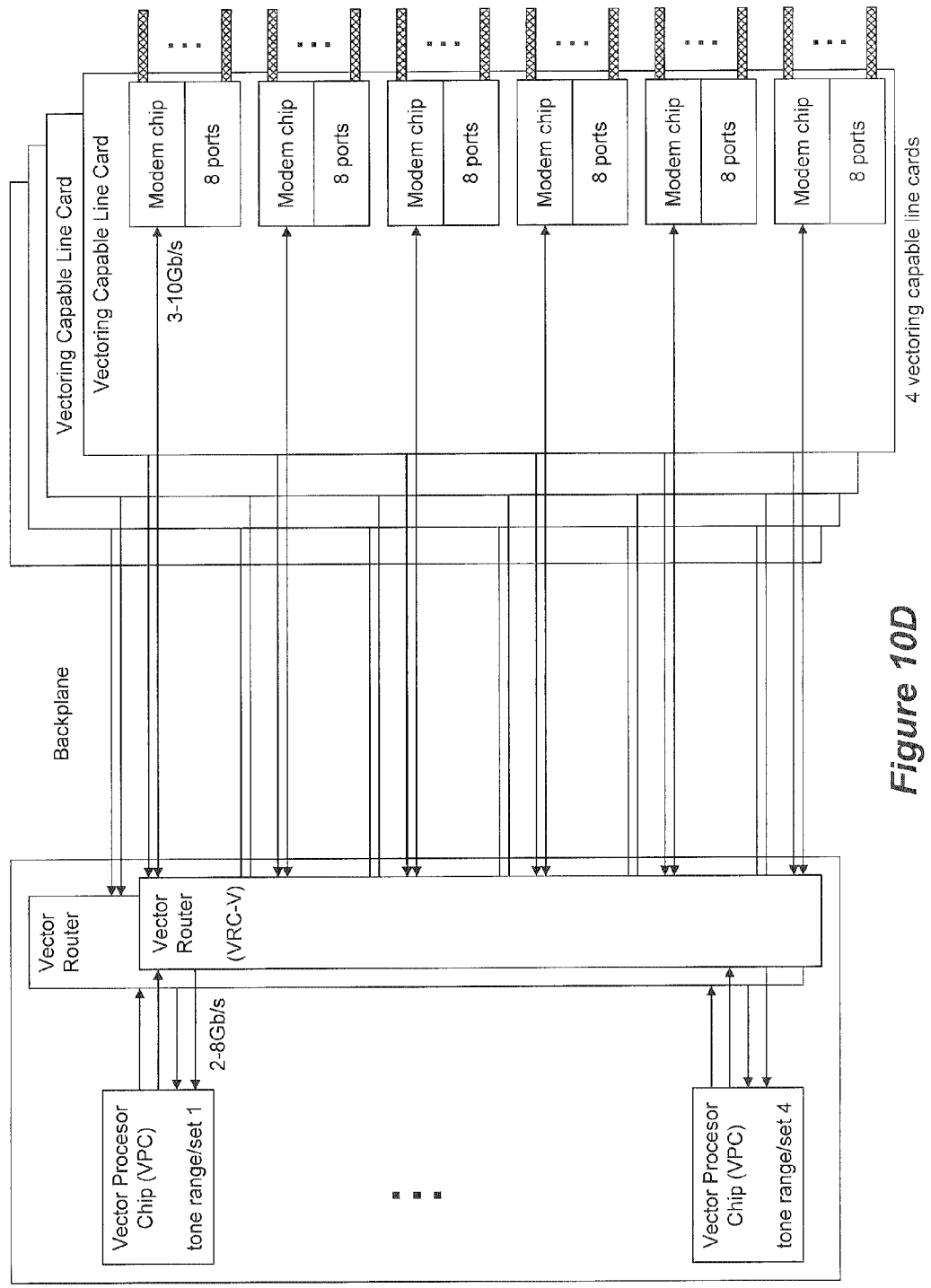
Figure 10E:
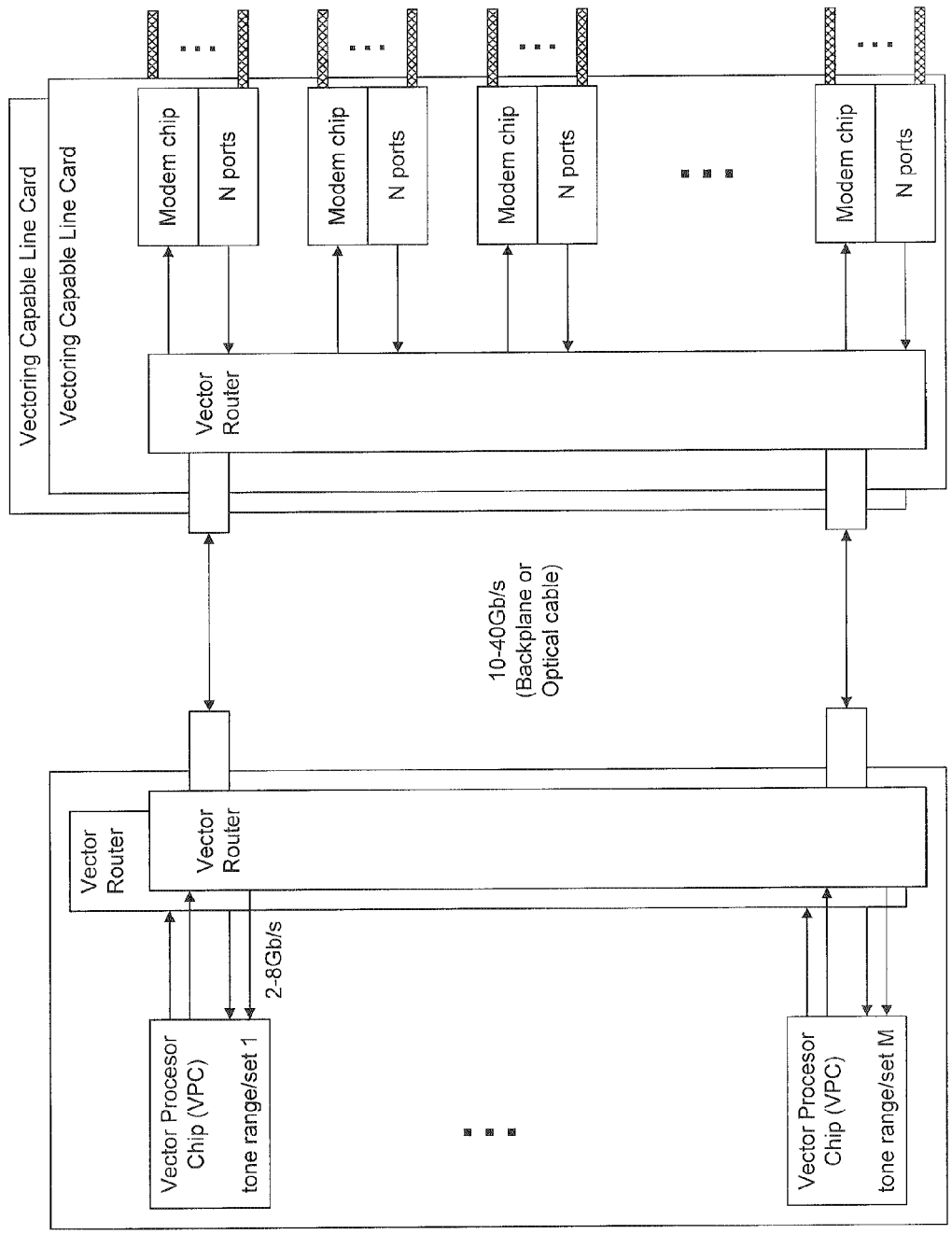

FIG. 10A illustrates one embodiment of a 48-port, single line card vectoring data communication system in which a single line card holds all modem ports, a vector router chip and any needed vector processing chips (in this example, 3 VPCs). The 48 ports are served in a relatively simple configuration and the system makes use of either copper backplane or optical cable communication to efficiently aggregate the FFT/IFFT data and interface between the line card and the vectoring card. FIG. 10B illustrates a multiple line card vectoring data communication system that serves 192 modem ports in an ITU 993.2 Profile 17a example. In the embodiment shown in FIG. 10C, no VRC-V is required, so the VPUs communicate directly with each line card's VRC-L. Similarly, FIG. 10D shows an embodiment in which no VRC-L is required, and each modem chip communications directly with a VRC-V. In this embodiment, modem chips on the "front" two line cards communicate with the "front" VRC-V, while modem chips on the "back" two line cards communicate with the "back" VRC-V. FIG. 10E shows yet another embodiment.

Exemplary system configurations are noted in Table 1:

| ITU 993.2 Profile | Modem ports/ chip | Modem chips/line card | Modem ports/line card | System line cards | System modem ports | System VRC-Vs | System VPCs |
| --- | --- | --- | --- | --- | --- | --- | --- |
| 8a | 12 | 4 | 48 | 4 | 192 | 2 | 6 |
| 12a | 12 | 4 | 48 | 4 | 192 | 2 | 8 |
| 17a | 12 | 4 | 48 | 4 | 192 | 4 | 8 |
| 30a | 8 | 3 | 24 | 4 | 96 | 4 | 6 |

The ITU 993.2 Profile 8a with 192 ports generates an estimated power dissipation of ~200 mW/port and 40 W for the total system (250 mW/port and 48 W for the 17a profile with 192 ports and 400 mW/port and 40 W for the 30a profile).

Figure 11:
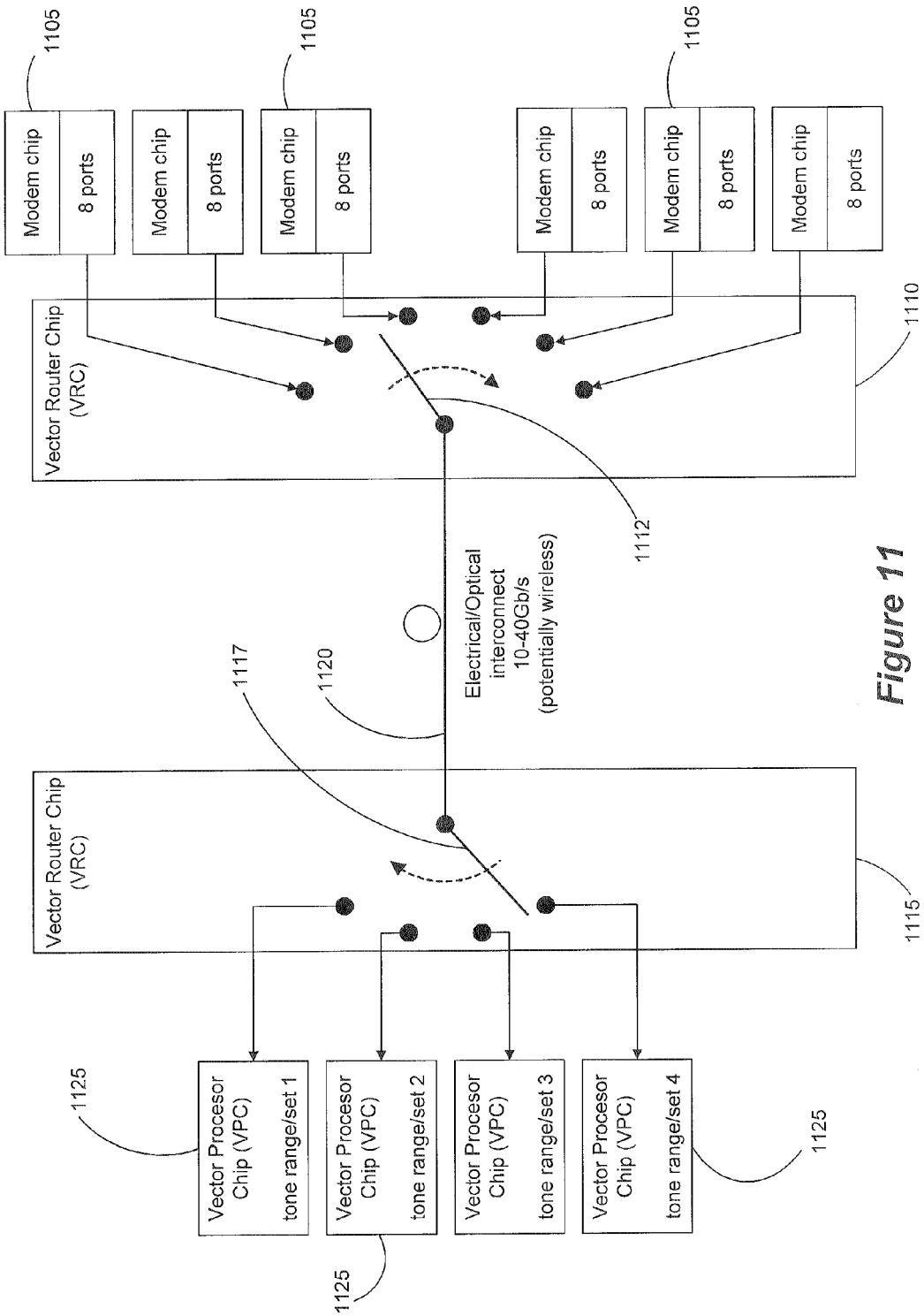
FIG. 11 is a block diagram showing an exemplary data transmission configuration for use in connection with one or more embodiments of the present invention.

FIG. 11 illustrates an embodiment of the present invention in which the vector router chips 1110, 1115 communicate data from six modems 1105 (the number of modems can vary as appropriate) to four VPCs 1125 (again, the number of VPCs can vary as appropriate) using a sweep-select 1112 to collect data from the modems 1105 and a sweep-distribution 1117 to distribute the collected data to the vector processor chips 1125. As can be seen in FIG. 11, the VRC-L 1110 is coupled to the VRC-V 1115 by a suitable interconnect 1120. The bus bandwidth used/needed/required can be determined in instance as follows:

$$\text{Bandwidth}=n\text{Ports}*(\text{Data\_Precision})*2*4\text{ kHz}$$

in which "2" indicates complex arithmetic. Finally, bandwidth bottlenecks can be avoided using the "striping" shown in FIG. 11.

Figure 12:
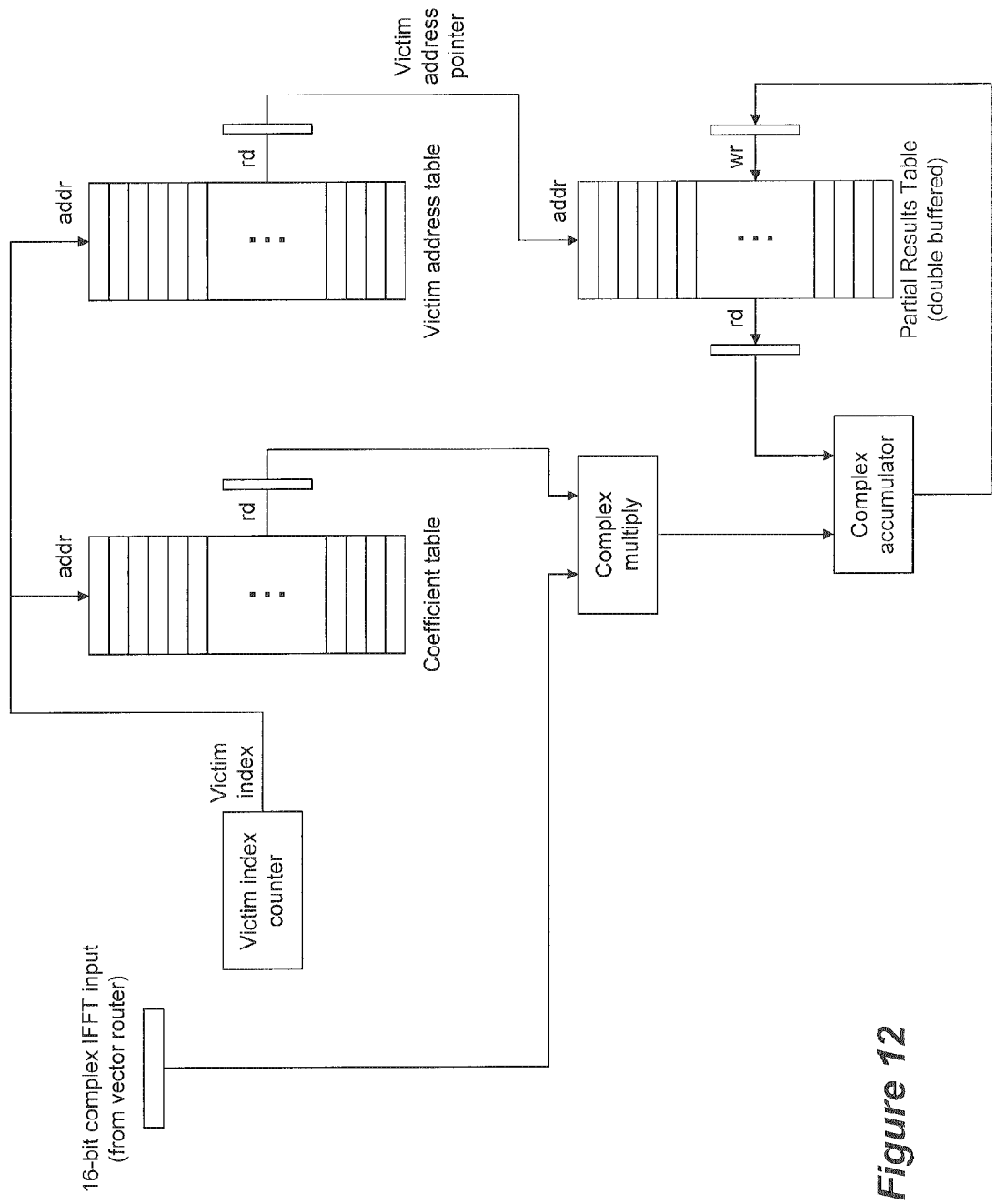
FIG. 12 is an exemplary logic implementation of a vector processor unit according to one or more embodiments of the present invention.

FIG. 12 illustrates one exemplary logic implementation of a vector processor unit. In this example, the sub-unit can process a single tone and FIG. 12 traces the data path for a vector processor core according to one or more embodiments of the present invention. This exemplary VPU is capable of processing one DMT tone at a time. As IFFT/FFT samples from each modem arrive from the vector router, the VPU determines the list of "victim" modems that must be FEXT canceled for this disturber. Using pre-determined FEXT cancellation coefficients from the coefficient table and the victim address list, the impact of this disturber can be accumulated into the partial results table for each victim modem (partial result of the FEXT cancellation operation). After the full set of disturber data has been received from the vector router for this tone and FEXT cancellation has been completed, the partial results table will then contain the resultant vectored IFFT/FFT samples for the current DMT tone, and this vectored data in then sent back to the vector router for transmission back to the modem ports.

Figure 13:
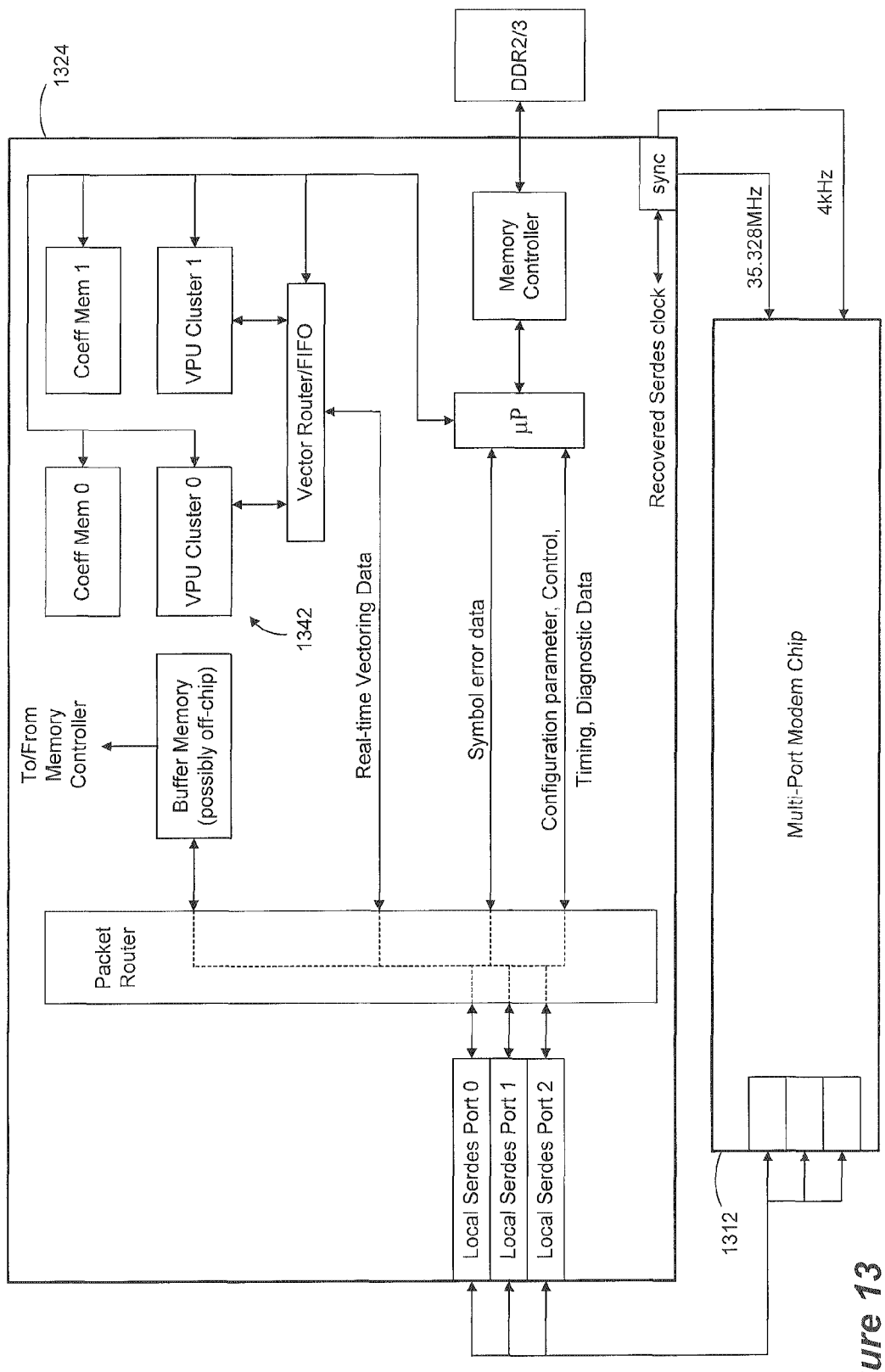
FIG. 13 is an exemplary vector processor implementing two VPUs and interfacing with at least one modem chip according to one or more embodiments of the present invention.

FIG. 13 shows an exemplary vector processor 1324 implementing two VPUs 1342 and interfacing with at least one modem chip 1312. Vector processor 1324 could be implemented in some embodiments of the present invention on a single FPGA, ASIC, etc. connected to modem chip 1312 or the like.

Figure 14:
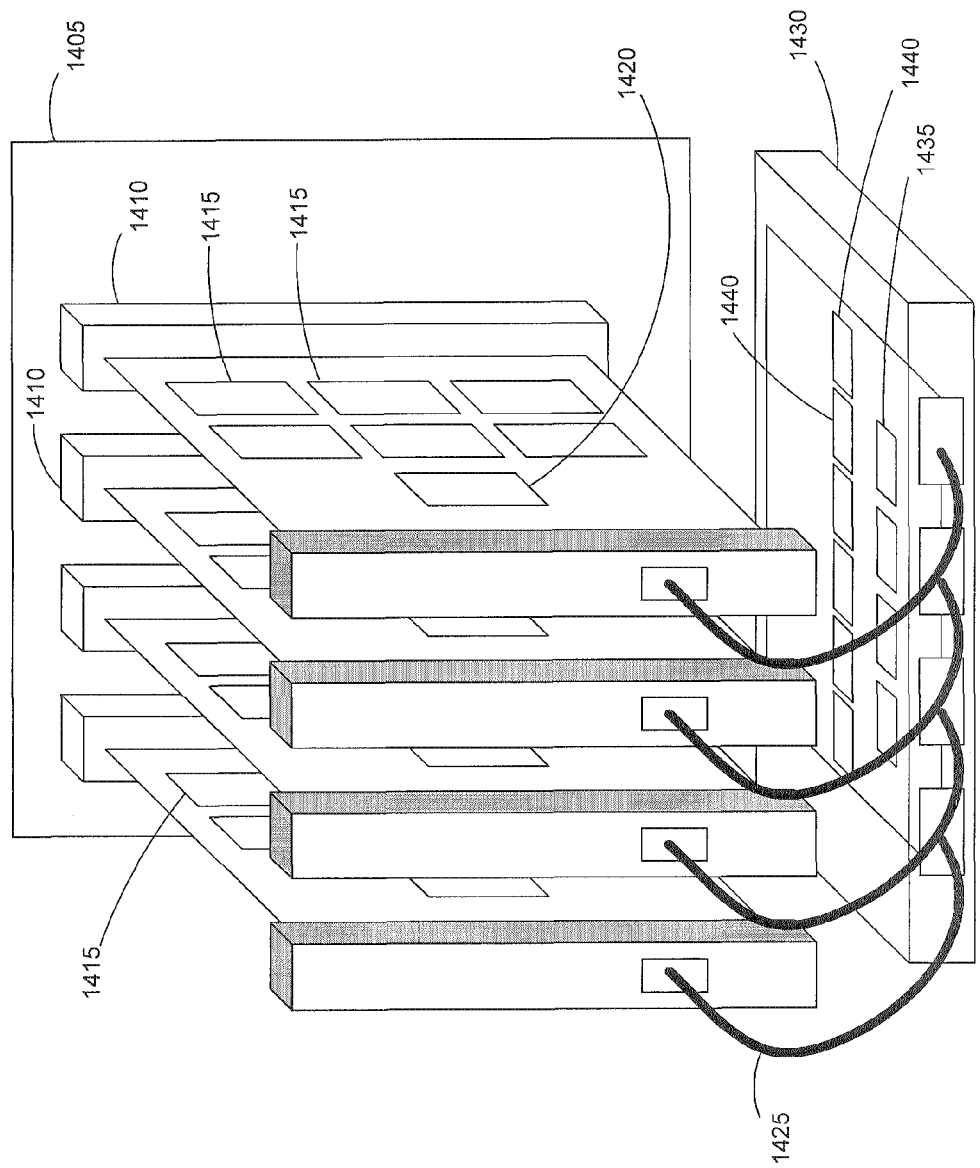
FIG. 14 is a DSLAM architecture embodiment showing a dedicated vectoring module with four line cards providing user data for vectoring.

The vectoring data communication system of FIG. 14 illustrates a DSLAM architecture embodiment showing a dedicated vectoring module 1430 with four line cards providing user data for vectoring. Line cards 1410 are mounted to a chassis or the like 1405 and each line card includes several modem chips 1415 and a vectoring interface device 1420. Each interface device 1420 communicates via optical interconnect 1425 with the vectoring module 1430, which can be a pizza box or a line card. Each module 1430 contains a line card interface chip 1435 that corresponds to one of the interface devices 1420 on line cards 1410. A number of processing chips 1440 are available for vector processing of user data.

Figure 15:
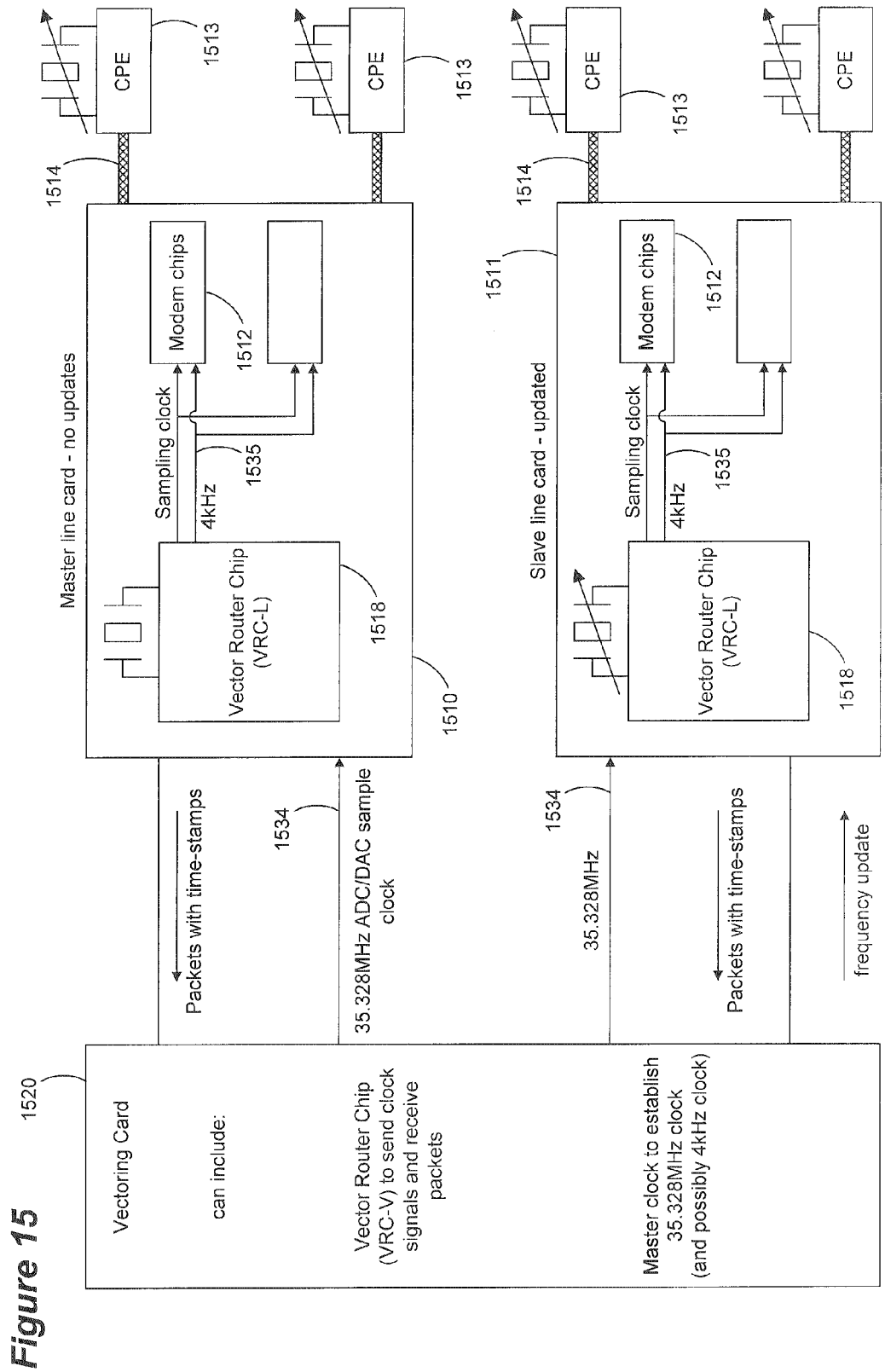
FIG. 15 illustrates clock synchronization of components in a vectored DSL system according to one or more embodiments of the present invention.

As illustrated in the system 1500 having a master line card 1510 and a slave line card 1511 in FIG. 15, in order for vectoring to work properly, all modems 1512 in the vector group must be synchronized to both an ADC/DAC sample clock 1534 and a DMT symbol clock 1535, shown as 35.328 MHz and 4 kHz, respectively. The DSLAM side modems 1512 are connected via DSL line 1514 to a number of customer-side DSL modems 1513. The high-speed sample clock is assumed to be distributed in some manner over a backplane or dedicated cable. The VRC-Ls 1518 can then phase lock to the high-speed sample clock and redistribute a low-noise sample clock to the modem chips 1517. In order to avoid sending a dedicated 4 kHz DMT symbol clock over the backplane or dedicated cable, it would be advantageous to use the high-speed communication interface intended to transmit vectoring data (XAUI or similar) to send timing information in data packets. The high-speed interface operates at a sufficiently high speed, that the approximate DMT symbol timing can be determined from such timing packets. As there is some tolerance to the exact DMT symbol timing (made possible, for example, by cyclic prefix and cyclic extension in the VDSL protocol), the VRC-L 1518 needs to determine only the approximate symbol timing provided that it will remain consistent thereafter (that is, synchronized to some fixed number of the high-speed sample clock periods).

Many features and advantages of the invention are apparent from the written description, and thus, the appended claims are intended to cover all such features and advantages. Further, numerous modifications and changes will readily occur to those skilled in the art, so the present invention is not limited to the exact operation and construction illustrated and described. Therefore, described embodiments are illustrative and not restrictive, and the invention should not be limited to the details given herein but should be defined by the following claims and their full scope of equivalents, whether foreseeable or unforeseeable now or in the future.

What is claimed is:

1. A vectored digital subscriber line (DSL) system, wherein the DSL system comprises:
a vectoring group comprising an upstream-end DSL apparatus coupled to a plurality of downstream-end DSL modems;
each downstream-end DSL modem configured to:
receive data transmitted by the upstream-end DSL apparatus, wherein each downstream-end DSL modem is configured to collect error signal data sent using a downstream DSL frequency band, wherein the downstream DSL frequency band comprises a plurality of DSL frequency sub-bands, wherein each sub-band contains P DSL tones, further wherein the collected error signal data corresponding to error signals received for one base point DSL tone in each sub-band; and
transmit collected error signal data to the upstream-end DSL apparatus;
the upstream-end DSL apparatus comprising:
one or more upstream-end DSL ports coupled to one or more of the downstream-end DSL modems;
a vector processor (VPC) configured to:
receive collected error signal data transmitted to the upstream-end apparatus by the plurality of downstream-end DSL modems;
generate error-signal-based far-end crosstalk (FEXT) cancellation coefficient values for each base point DSL tone, wherein each error-signal-based FEXT cancellation coefficient value is calculated using the received error signal data; and
generate approximated FEXT cancellation coefficient values for the (P-1) DSL tones other than the base point DSL tone in each sub-band, wherein the approximated FEXT cancellation coefficient values for each sub-band are calculated using the error-signal-based FEXT cancellation coefficient value for the base point DSL tone in that sub-band; and
perform DSL vectoring for transmissions on DSL lines in the vectoring group using the generated error-signal-based FEXT cancellation coefficient values and the approximated FEXT cancellation coefficient values.

2. The vectored DSL system of claim 1 further comprising a memory unit coupled to the VPC and configured to store the generated error-signal-based FEXT cancellation coefficient values and the approximated FEXT cancellation coefficient values.

3. The vectored DSL system of claim 2 wherein the one or more upstream-end DSL ports, the VPC and the memory unit are all implemented on a single chip, the single chip being one of the following: a chip, an application-specific integrated circuit (ASIC), a field-programmable gate array (FPGA), a digital signal processing (DSP) chip, an integrated circuit (IC).

4. A method for performing vectored digital subscriber line (DSL) processing for transmissions on a DSL line, the method comprising:
collecting error signal data from the DSL line, the collected error signal data corresponding to DSL tones in a first DSL tone subset in a DSL frequency band, wherein the DSL frequency band has K tones, further wherein the first DSL tone subset contains Q tones, and further wherein Q<K;
generating a combined set of far-end crosstalk (FEXT) cancellation coefficient values $G_{ij}$ for the DSL frequency band, wherein generating the combined set of FEXT cancellation coefficient values comprises:
generating error-signal-based FEXT cancellation coefficient values for the DSL tones in the first DSL tone subset, wherein the error-signal-based FEXT cancellation coefficient values are calculated using the collected error signal data; and
generating approximated FEXT cancellation coefficient values for DSL tones in a second DSL tone subset, wherein the approximated FEXT cancellation coefficient values are calculated using one or more of the error-signal-based FEXT cancellation coefficient values, and further wherein the second DSL tone subset contains not more than (K-Q) tones in the DSL frequency band not contained in the first DSL tone subset; and
performing vectored DSL processing for transmissions on the DSL line using the combined set of FEXT cancellation coefficient values $G_{ij}$.

5. The method of claim 4 wherein Q is one of the following: less than 90% of K; less than 75% of K; less than 50% of K; less than 25% of K; less than 10% of K.

6. The method of claim 4 wherein the Q tones in the first DSL tone subset are generally evenly distributed within the DSL frequency band.

7. The method of claim 4 wherein generating approximated FEXT cancellation coefficients comprises:
defining a DSL frequency sub-band within the DSL frequency band, the sub-band comprising:
a first DSL tone from the first DSL tone subset, wherein the first DSL tone has a first DSL tone error-signal-based FEXT cancellation coefficient value, and further wherein the first DSL tone is a sub-band base point DSL tone and the first DSL tone error-signal-based FEXT cancellation coefficient value is a sub-band FEXT cancellation coefficient base value; and
a plurality of DSL tones from the second DSL tone subset; and
approximating FEXT cancellation coefficient values for the plurality of DSL tones from the second DSL tone subset in the sub-band, comprising generating an approximation of an actual FEXT cancellation coefficient value curve for the sub-band using one or more of the following:
an offset linear approximation of the actual FEXT cancellation coefficient value curve, wherein the linear approximation comprises a line offset;
a non-offset linear approximation of the actual FEXT cancellation coefficient value curve;
a polynomial approximation of the actual FEXT cancellation coefficient value curve.

8. The method of claim 7 wherein the linear approximation of the FEXT cancellation coefficient curve, whether offset or non-offset, comprises a generally straight line calculated using the sub-band FEXT cancellation coefficient base value and any other error-signal-based FEXT cancellation coefficient values of any first DSL tone subset DSL tones in the sub-band;
further wherein the approximated FEXT cancellation coefficient values for the plurality of DSL tones from the second DSL tone subset in the sub-band lie on the generally straight line.

9. The method of claim 8 further comprising generating a sub-band FEXT cancellation coefficient value vector for the DSL frequency sub-band, the vector comprising:
sub-band identification information;
sub-band FEXT cancellation coefficient base value data, wherein sub-band FEXT cancellation coefficient base value data is expressed as one of the following:
a coefficient value; or
the difference between the sub-band FEXT cancellation coefficient base value and a coefficient value of another DSL tone in the DSL frequency band.

10. The method of claim 9 wherein the sub-band FEXT cancellation coefficient value vector for the DSL frequency sub-band further comprises sub-band approximated FEXT cancellation coefficient value reconstruction data expressed as at least one of the following:
the slope of a linear approximation of the actual FEXT cancellation coefficient value curve;
a line offset for a linear approximation of the actual FEXT cancellation coefficient value curve;
polynomial definition data defining a polynomial approximation of the actual FEXT cancellation coefficient value curve.

11. The method of claim 9 wherein there are Q sub-bands in the DSL frequency band and further wherein each sub-band contains one first DSL tone subset DSL tone having an error-signal-based FEXT cancellation coefficient value, and further wherein each sub-band contains approximately ((K-Q)/Q) second DSL tone subset DSL tones that each have an approximated FEXT cancellation coefficient value.

12. The method of claim 4 wherein collecting error signal data is performed in a downstream-end DSL device; and further wherein the downstream-end DSL device transmits the collected error signal data to DSLAM equipment; and further wherein the DSLAM equipment performs generating the combined set of FEXT cancellation coefficient values $G_{ij}$ for the DSL frequency band and performing vectored DSL processing for transmissions on the DSL line using the generated combined set of FEXT cancellation coefficient values $G_{ij}$;
wherein the error signal data transmitted to the DSLAM equipment comprises a plurality of incremental values, wherein each incremental value is representative of the difference between collected error signals for two different DSL tones in the first DSL tone subset.

\* \* \* \* \*

UNITED STATES PATENT AND TRADEMARK OFFICE
CERTIFICATE OF CORRECTION

PATENT NO. : 8,687,497 B2
APPLICATION NO. : 13/002213
DATED : April 1, 2014
INVENTOR(S) : Nicholas P. Sands et al.

It is certified that error appears in the above-identified patent and that said Letters Patent is hereby corrected as shown below:

In the Specification:

In Column 6, Line 61, delete "modern)" and insert -- modem) --, therefor.

In Column 8, Line 19, delete "moderns" and insert -- modems --, therefor.

In Column 9, Lines 19-20, delete "hit-rate" and insert -- bit-rate --, therefor.

In Column 14, Line 34, delete "training" and insert -- training. --, therefor.

In Column 21, Line 45, delete "moderns" and insert -- modems --, therefor.

Signed and Sealed this
First Day of July, 2014

Michelle K. Lee
*Deputy Director of the United States Patent and Trademark Office*